(12) United States Patent
Yang

(10) Patent No.: US 11,711,674 B2
(45) Date of Patent: Jul. 25, 2023

(54) METHOD AND SYSTEM FOR PERFORMING CHARGING ON NETWORK RESOURCE, AND DEVICE

(71) Applicant: HUAWEI TECHNOLOGIES CO., LTD., Guangdong (CN)

(72) Inventor: Enfeng Yang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 72 days.

(21) Appl. No.: 17/512,807

(22) Filed: Oct. 28, 2021

(65) Prior Publication Data

US 2022/0053306 A1 Feb. 17, 2022

Related U.S. Application Data

(63) Continuation of application No. PCT/CN2020/074207, filed on Feb. 3, 2020.

(30) Foreign Application Priority Data

Apr. 29, 2019 (CN) .......................... 201910356674.8

(51) Int. Cl.
*H04W 4/24* (2018.01)
*H04W 24/02* (2009.01)
(Continued)

(52) U.S. Cl.
CPC ............. *H04W 4/24* (2013.01); *H04W 24/02* (2013.01); *H04W 28/0268* (2013.01); *H04W 28/16* (2013.01)

(58) Field of Classification Search
CPC ... H04W 4/24; H04W 24/02; H04W 28/0268; H04W 28/16; H04W 24/10;
(Continued)

(56) References Cited

U.S. PATENT DOCUMENTS 10,070,344 B1 * 9/2018 Dowlatkhah ......... H04W 28/16
2018/0220276 A1   8/2018 Senarath et al.
(Continued)

FOREIGN PATENT DOCUMENTS

CN    109218047 A    1/2019
CN    109525625 A    3/2019
(Continued)

OTHER PUBLICATIONS

Huawei et al., "Addition of a few editorial corrections and many clarifications between NW Slice and NW Slice Instance," 3GPP TSG-SA5 Meeting #124, S5-192274, Taipei, Taiwan, Feb. 25-Mar. 1, 2019, 6 pages.
(Continued)

*Primary Examiner* — Huy C Ho
(74) *Attorney, Agent, or Firm* — Fish & Richardson P.C.

(57) ABSTRACT

This application provides example methods, systems, and devices for performing charging on a network resource. One example method includes sending, by a network slice charging function device, a first message to a network slice management function device, where the first message includes an identifier of a network slice instance and filtering information, the filtering information indicates the network slice management function device to send a value that is of a network slice performance indicator of the network slice instance and that matches the filtering information, and the network slice performance indicator describes network performance of the network slice instance. The network slice charging function device can then receive a second message from the network slice management function device, where
(Continued)

the second message includes the value. The network slice charging function device can then perform charging on the network slice instance based on the value.

20 Claims, 8 Drawing Sheets

(51) Int. Cl.
*H04W 28/02* (2009.01)
*H04W 28/16* (2009.01)

(58) Field of Classification Search
CPC ... H04L 41/342; H04L 41/40; H04L 12/1407; H04L 41/5009; H04L 12/1403; H04L 12/1432; H04M 15/41; H04M 15/43; H04M 15/44; H04M 15/62; H04M 15/66; H04M 15/853
USPC .......................................................... 455/406
See application file for complete search history.

(56) References Cited

U.S. PATENT DOCUMENTS

| | | | |
|---|---|---|---|
| 2018/0220277 A1 | 8/2018 | Senarath et al. | |
| 2019/0053104 A1 | 2/2019 | Qiao et al. | |
| 2020/0053834 A1* | 2/2020 | Dahan | H04L 41/0816 |
| 2020/0195495 A1* | 6/2020 | Parker | H04L 41/082 |

FOREIGN PATENT DOCUMENTS

| | | |
|---|---|---|
| WO | 2019005067 A1 | 1/2019 |
| WO | 2019005069 A1 | 1/2019 |
| WO | 2019056960 A1 | 3/2019 |

OTHER PUBLICATIONS

PCT International Search Report and Written Opinion issued in International Application No. PCT/CN2020/074207 dated May 6, 2020, 15 pages (with English translation).
Huawei, "Addition of Key Issues and Solution for SLA Based Charging," 3GPP TSG-SA5 Meeting #123, S5-191088, Montreal, Canada, Jan. 21-25, 2019, 4 pages.
Office Action in Chinese Appln. No. 201910356674.8, dated Nov. 25, 2022, 8 pages.
3GPP TR 23.791 V16.1.0 (Mar. 2019), "3rd Generation Partnership Project; Technical Specification Group Services and System Aspects; Study of Enablers for Network Automation for 5G (Release 16)," Mar. 2019, 124 pages.
3GPP TR 32.845 V0.3.0 (Mar. 2019), "3rd Generation Partnership Project; Technical Specification Group Services and System Aspects; Charging management; Study on Charging Aspects of Network Slicing; (Release 16)," Mar. 2019, 17 pages.
Extended European Search Report issued in European Application No. 20798297.6 dated Apr. 28, 2022, 10 pages.

* cited by examiner

METHOD AND SYSTEM FOR PERFORMING CHARGING ON NETWORK RESOURCE, AND DEVICE

CROSS-REFERENCE TO RELATED APPLICATIONS

This application is a continuation of International Application No. PCT/CN2020/074207, filed on Feb. 3, 2020, which claims priority to Chinese Patent Application No. 201910356674.8, filed on Apr. 29, 2019. The disclosures of the aforementioned applications are hereby incorporated by reference in their entireties.

TECHNICAL FIELD

This application relates to the field of communications technologies, and in particular, to a method and a system for performing charging on a network resource, and a device.

BACKGROUND

Main application scenarios of a 5th generation (5G) network include an enhanced mobile broadband (eMBB) scenario, an ultra-reliable low-latency communication (URLLC) scenario, a massive machine-type communications (mMTC) scenario, and the like. These scenarios have different requirements on network features. For example, in the mMTC scenario, there are many devices, but a throughput of each device may be extremely low and a small bandwidth is required. In the eMBB scenario, almost an opposite feature is required because there are much fewer devices, but each device sends or receives a large amount of data and a large bandwidth is required. In the URLLC scenario, there is a high requirement on an end-to-end latency. For example, in an automatic driving scenario, a latency needs to be less than 3 milliseconds. To meet requirements of the foregoing different application scenarios, a physical network may be divided at an end-to-end layer, to form network slices, so as to implement traffic grouping, tenant isolation, and resource configuration on a macroscopic scale. A network slice is essentially a virtual network running on a shared physical network infrastructure. An operator may create, based on different service requirements (for example, requirements on a latency, a bandwidth, security, and reliability), virtual networks (corresponding to network slice instances) that meet corresponding service requirements on the physical network infrastructure for customers having different requirements on network features. In this way, a network resource utilization rate and quality of service of a network service are improved.

In the conventional technology, a solution for performing charging on a network resource is as follows: A service system triggers a charging system to perform charging based on a service event such as start or end of a service, and the service system collects statistics about accurate service information (such as traffic and duration used by the service) and reports the accurate service information to the charging system, so that the charging system can perform rating and fee deduction based on the accurate service information.

If charging is still performed on the network slice instance according to the foregoing charging solution, a waste of network resources is easily caused, and consequently a network resource utilization rate or quality of service of a network service is reduced.

SUMMARY

In view of this, it is necessary to provide a method and a system for performing charging on a network resource, and a device, so as to avoid a waste of network resources and help improve a network resource utilization rate of an operator.

According to a first aspect, an embodiment of this application provides a system for performing charging on a network resource. The system includes a network slice management function (NSMF) device and a network slice charging function (NSCF) device. The NSCF device sends a first message to the NSMF device, where the first message includes an identifier of a network slice instance and filtering information, the filtering information is used to indicate the NSMF device to send a value that is of a network slice performance indicator of the network slice instance and that matches the filtering information, and the network slice performance indicator is used to describe network performance of the network slice instance. When obtaining the value that is of the network slice performance indicator of the network slice instance and that matches the filtering information, the NSMF device sends a second message to the NSCF device, where the second message includes the value that is of the network slice performance indicator of the network slice instance and that matches the filtering information. When receiving the second message from the NSMF device, the NSCF device performs charging on the network slice instance based on the value of the network slice performance indicator.

Compared with a conventional linear charging method that is merely based on terminal service data (such as traffic or duration), in the system for performing charging on the network slice instance, responsibilities of the NSCF device and the NSMF device are clear. The NSCF device determines the filtering information, the NSMF device obtains the network slice performance indicator, the NSCF device performs charging based on the value that is of the network slice performance indicator and that matches the filtering information, and the NSCF device performs charging according to a charging rule when the value that is of the network slice performance indicator and that matches the filtering information is not received. Therefore, a waste of network resources is avoided, a network resource utilization rate is improved or quality of service of a network service is improved, an amount of data transmitted between the NSCF device and the NSMF device is further reduced, and transmission pressure and storage load of the NSCF device and the NSMF device are reduced.

In a possible solution, the filtering information includes an indication identifier, the indication identifier is used to indicate the NSMF device to send a value that is of the network slice performance indicator of the network slice instance and that corresponds to a constraint condition, and the constraint condition is a constraint condition that is of the network slice performance indicator and that is stored in the NSMF device.

In a possible solution, the filtering information includes a constraint condition, and the constraint condition is used to indicate the NSMF device to send a value that is of the network slice performance indicator of the network slice instance and that corresponds to the constraint condition.

In a possible solution, before sending the first message to the NSMF device, the NSCF device further determines the network slice performance indicator of the network slice instance and the constraint condition.

In a possible solution, that the NSCF device determines the network slice performance indicator of the network slice instance specifically includes: determining the network slice performance indicator based on subscription information, of a customer, for subscribing to the network slice instance or configuration information preset by an operator.

In a possible solution, that the NSCF device determines the constraint condition specifically includes: determining the constraint condition based on a charging condition of the network slice performance indicator.

In a possible solution, the subscription information includes any one or any combination of a service level agreement term, a network slice type, a network slice template, or subscription duration of the network slice instance.

In a possible solution, that the NSMF device obtains a value that is of the network slice performance indicator of the network slice instance and that matches the filtering information specifically includes: obtaining a value that is of the network slice performance indicator and that meets the constraint condition, or obtaining a value that is of the network slice performance indicator and that does not meet the constraint condition.

In a possible solution, the value of the network slice performance indicator includes one or more values of the network slice performance indicator and time corresponding to the one or more values. That the NSMF device obtains a value that is of the network slice performance indicator and that meets the constraint condition specifically includes: obtaining one or more values that are of the network slice performance indicator and that meet the constraint condition and the time corresponding to the one or more values. That the NSCF device performs charging on the network slice instance based on the value that is of the network slice performance indicator specifically includes: performing charging on the network slice instance based on the one or more values of the network slice performance indicator and the time corresponding to the one or more values.

In a possible solution, the value of the network slice performance indicator includes one or more values of the network slice performance indicator and time corresponding to the one or more values. That the NSMF device obtains a value that is of the network slice performance indicator and that does not meet the constraint condition specifically includes: obtaining one or more values that are of the network slice performance indicator and that do not meet the constraint condition and the time corresponding to the one or more values. That the NSCF device performs charging on the network slice instance based on the value that is of the network slice performance indicator specifically includes: performing charging on the network slice instance based on the one or more values of the network slice performance indicator and the time corresponding to the one or more values.

In a possible solution, that the NSCF device performs charging on the network slice instance based on the value of the network slice performance indicator specifically includes: storing the one or more values of the network slice performance indicator in a charging data record, or calculating a fee for use of the network slice instance based on the one or more values of the network slice performance indicator.

In a possible solution, the first message further includes an obtaining time range and an obtaining method, and the value of the network slice performance indicator includes one or more values of various performance indicators related to the network slice instance. That the NSMF device obtains a value of the network slice performance indicator of the network slice instance and that matches the filtering information specifically includes: obtaining the value of the network slice performance indicator within the obtaining time range by using the obtaining method.

In a possible solution, when the NSCF device does not receive the second message from the NSMF device, the NSCF device performs charging on the network slice instance according to a charging rule corresponding to the network slice performance indicator, where the second message is sent by the NSMF device when the NSMF device obtains the value that is of the network slice performance indicator of the network slice instance and that matches the filtering information, and the second message includes the value that is of the network slice performance indicator of the network slice instance and that matches the filtering information; or when receiving a third message from the NSMF device, the NSCF device performs charging on the network slice instance according to a charging rule corresponding to the network slice performance indicator, where the third message does not include the value that is of the network slice performance indicator of the network slice instance, that matches the filtering information, and that is included in the second message, and the second message is sent by the NSMF device when the NSMF device obtains the value that is of the network slice performance indicator of the network slice instance and that matches the filtering information.

In a possible solution, the first message is a subscription request message, the second message is a subscription notification message, and the first message further includes an address for receiving data. The NSCF device sends the subscription request message to the NSMF device, and after receiving the subscription request message, the NSMF device generates a subscription resource for the network slice instance, and sends the subscription notification message to the NSCF device based on the address for receiving data.

In a possible solution, the NSCF device sends, to the NSMF device, a subscription update request message for updating the subscription resource, where the subscription update request message includes any one or any combination of updated target filtering information, an updated target obtaining time range, an updated target interval time, an updated target obtaining method, and an updated target network slice performance indicator; the NSMF device performs a subscription changing operation on the subscription resource based on the subscription update request message; and the NSMF device sends, to the NSCF device, the value that is of the network slice performance indicator and that exists before the subscription resource changes.

In a possible solution, the NSCF device sends an unsubscription request message related to the subscription resource to the NSMF device; the NSMF device performs an unsubscription operation on the subscription resource based on the unsubscription request message; and the NSMF device sends, to the NSCF device, the value that is of the network slice performance indicator and that exists before unsubscription related to the subscription resource.

According to a second aspect, an embodiment of this application provides a method for performing charging on a network resource. The method includes: A network slice charging function (NSCF) device sends a first message to a network slice management function (NSMF) device, where the first message includes an identifier of a network slice instance and filtering information, the filtering information is used to indicate the NSMF device to send a value that is of a network slice performance indicator of the network slice instance and that matches the filtering information, and the network slice performance indicator is used to describe network performance of the network slice instance; the NSCF device receives a second message from the NSMF device, where the second message is sent by the NSMF device when the NSMF device obtains the value that is of the network slice performance indicator of the network slice instance and that matches the filtering information, and the second message includes the value that is of the network slice performance indicator of the network slice instance and that matches the filtering information; and the NSCF device performs charging on the network slice instance based on the value of the network slice performance indicator.

Compared with a conventional linear charging method that is merely based on terminal service data (such as traffic or duration), in this method, a charging condition met by a network slice performance indicator of each network slice instance is pre-negotiated, and each network slice performance indicator meets a different charging condition in different scenarios. Therefore, to reduce workload of the NSMF device, the NSCF device may determine, based on the charging condition of the network slice performance indicator in the network slice instance, the filtering information that meets an actual situation, so that the NSMF device can obtain the value that is of the network slice performance indicator of the network slice instance and that matches the filtering information, and does not need to obtain values of all network slice performance indicators of the network slice instance. Therefore, the NSCF device may perform charging on the network slice instance based on the value that is of the network slice performance indicator of the network slice instance, that matches the filtering information, and that is sent by the NSMF device, so as to avoid a waste of network resources, help improve a network resource utilization rate or improve quality of service of a network service, reduce an amount of data transmitted between the NSCF device and the NSMF device, and reduce transmission pressure and storage load of the NSCF device and the NSMF device.

In a possible solution, the filtering information includes an indication identifier, the indication identifier is used to indicate the NSMF device to send a value that is of the network slice performance indicator of the network slice instance and that corresponds to a constraint condition, and the constraint condition is a constraint condition that is of the network slice performance indicator and that is stored in the NSMF device.

In a possible solution, the filtering information includes a constraint condition, and the constraint condition is used to indicate the NSMF device to send a value that is of the network slice performance indicator of the network slice instance and that corresponds to the constraint condition.

In a possible solution, before sending the first message to the NSMF device, the NSCF device further determines the network slice performance indicator of the network slice instance and the constraint condition.

In a possible solution, that the NSCF device determines the network slice performance indicator of the network slice instance specifically includes: determining the network slice performance indicator based on subscription information, of a customer, for subscribing to the network slice instance or configuration information preset by an operator.

In a possible solution, that the NSCF device determines the constraint condition specifically includes: determining the constraint condition based on a charging condition of the network slice performance indicator.

In a possible solution, the subscription information includes any one or any combination of a service level agreement term, a network slice type, a network slice template, or subscription duration of the network slice instance.

In a possible solution, the value of the network slice performance indicator includes one or more values of the network slice performance indicator, and that the NSCF device performs charging on the network slice instance based on the value of the network slice performance indicator specifically includes: storing the one or more values of the network slice performance indicator in a charging data record, or calculating a fee for use of the network slice instance based on the one or more values of the network slice performance indicator.

In a possible solution, the value of the network slice performance indicator further includes time corresponding to one or more values of the network slice performance indicator, and that the NSCF device performs charging on the network slice instance based on the value of the network slice performance indicator specifically includes: correspondingly storing the one or more values of the network slice performance indicator into the charging data record, or storing time at which the second message is received as the time corresponding to the one or more values of the network slice performance indicator into the charging data record.

In a possible solution, the first message further includes an obtaining time range, and the obtaining time range is used to indicate the NSMF device to obtain the value of the network slice performance indicator within the obtaining time range.

In a possible solution, the first message further includes an obtaining method, and the obtaining method is used to indicate the NSMF device to obtain the value of the network slice performance indicator within the obtaining time range by using the obtaining method.

In a possible solution, the method further includes: When the NSCF device does not receive the second message from the NSMF device, the NSCF device performs charging on the network slice instance according to a charging rule corresponding to the network slice performance indicator, where the second message is sent by the NSMF device when the NSMF device obtains the value that is of the network slice performance indicator of the network slice instance and that matches the filtering information, and the second message includes the value that is of the network slice performance indicator of the network slice instance and that matches the filtering information; or when receiving a third message from the NSMF device, the NSCF device performs charging on the network slice instance according to a charging rule corresponding to the network slice performance indicator, where the third message does not include the value that is of the network slice performance indicator of the network slice instance, that matches the filtering information, and that is included in the second message, and the second message is sent by the NSMF device when the NSMF device obtains the value that is of the network slice performance indicator of the network slice instance and that matches the filtering information.

In the foregoing possible solution, when receiving the value that is of the network slice performance indicator, that matches the filtering information, and that is provided by the NSMF device, the NSCF device may perform charging on the network slice instance based on the value that is of the network slice performance indicator of the network slice instance and that matches the filtering information. When the NSCF device does not receive the value that is of the network slice performance indicator, that matches the filtering information, and that is provided by the NSMF device, the NSCF device may perform charging on the network slice instance according to the charging rule corresponding to the network slice performance indicator, so that the NSMF device does not need to collect values of all network slice performance indicators. In this way, an amount of data transmitted between the NSMF device and the NSCF device is reduced, so as to avoid frequent data transmission between the NSMF device and the NSCF device, reduce communication bandwidth occupation between the NSMF device and the NSCF device, reduce calculation load of charging performed by the NSCF device, and improve performance of the NSCF device.

In addition, the NSMF device may alternatively store the values of all the network slice performance indicators, and may first compress the values of all the network slice performance indicators when a network resource is idle, and then send the compressed values of all the network slice performance indicators to the NSCF device, so that the NSCF device can obtain the values of all the network slice performance indicators. Because the network slice performance indicator is data that a customer cares about, and can better reflect an investment of an operator, a matching degree between a charging result of the customer and a network resource investment is improved, the foregoing diversified application scenarios are facilitated, and diversified network service requirements of industry customers are met.

In a possible solution, the first message further includes an interval time, and the interval time is used to indicate a time interval between two consecutive times of obtaining the value of the network slice performance indicator by the NSMF device. In this solution, the NSCF device may indicate an obtaining time interval to the NSMF device, to better meet a charging requirement. For example, a value of a network slice performance indicator based on a higher time density is more accurate, so that charging is more accurate.

In a possible solution, the first message is a subscription request message, the second message is a subscription notification message, the subscription request message is used to request the NSMF device to generate a subscription resource for the network slice instance, and the first message further includes an address for receiving data, to indicate the NSMF device to send the subscription notification message to the NSCF device based on the address.

In a possible solution, the method further includes: The NSCF device sends, to the NSMF device, a subscription update request message for updating the subscription resource, where the subscription update request message includes any one or any combination of updated target filtering information, an updated target obtaining time range, an updated target interval time, an updated target obtaining method, and an updated target network slice performance indicator; and the NSCF device receives, from the NSMF device, the value that is of the network slice performance indicator and that exists before the subscription resource changes.

In a possible solution, the method further includes: The NSCF device sends an unsubscription request message related to the subscription resource to the NSMF device; and the NSCF device receives, from the NSMF device, the value that is of the network slice performance indicator and that exists before unsubscription related to the subscription resource.

In the foregoing possible solution, a subscription-notification mechanism is used, so that the value of the network slice performance indicator is transferred between the NSMF device and the NSCF device in a timely manner.

According to a third aspect, an embodiment of this application provides a method for performing charging on a network resource. The method includes: A network slice management function (NSMF) device receives a first message from a network slice charging function (NSCF) device, where the first message includes an identifier of a network slice instance and filtering information, and the network slice performance indicator is used to describe network performance of the network slice instance; the NSMF device obtains a value that is of the network slice performance indicator of the network slice instance and that matches the filtering information; and the NSMF device sends a second message to the NSCF device, where the second message includes the value that is of the network slice performance indicator of the network slice instance and that matches the filtering information, and the second message is used by the NSCF device to perform charging on the network slice instance based on the value of the network slice performance indicator.

In this method, the NSMF device may provide, for the NSCF device, the value that is of the network slice performance indicator and that matches the filtering information, but does not need to provide values of all network slice performance indicators. Further, when obtaining the value that is of the network slice performance indicator and that matches the filtering information, the NSMF device may send, to the NSCF device, the value that is of the network slice performance indicator of the network slice instance and that matches the filtering information, so that the NSCF device may perform charging on the network slice instance based on the value that is of the network slice performance indicator of the network slice instance and that matches the filtering information. When the NSMF device does not obtain the value that is of the network slice performance indicator and that matches the filtering information, the NSMF device cannot send the value that is of the network slice performance indicator of the network slice instance and that matches the filtering information to the NSCF device. In this way, the NSCF device may perform charging on the network slice instance according to a charging rule corresponding to the network slice performance indicator, so that the value that is of the network slice performance indicator and that matches the filtering information is transferred between the NSMF device and the NSCF device, and the values of all the network slice performance indicators do not need to be transferred. In this way, frequent data transmission between the NSMF device and the NSCF device is avoided, communication bandwidth occupation between the NSMF device and the NSCF device is reduced, and calculation load on an NSCF device side is reduced. In addition, the NSMF device may alternatively store the values of all the network slice performance indicators, and may first compress the values of all the network slice performance indicators when a network resource is idle, and then send the compressed values of all the network slice performance indicators to the NSCF device, so that the NSCF device can obtain the values of all the network slice performance indicators. Because the network slice performance indicator is data that a customer cares about, and can better reflect an investment of an operator, a matching degree between a charging result of the customer and a network resource investment is improved, the foregoing diversified application scenarios are facilitated, and diversified network service requirements of industry customers are met.

In a possible solution, the filtering information includes an indication identifier, the indication identifier is used to indicate the NSMF device to send a value that is of the network slice performance indicator of the network slice instance and that corresponds to a constraint condition, and the constraint condition is a constraint condition that is of the network slice performance indicator and that is stored in the NSMF device.

In a possible solution, the filtering information includes a constraint condition, and the constraint condition is used to indicate the NSMF device to send a value that is of the network slice performance indicator of the network slice instance and that corresponds to the constraint condition.

In a possible solution, that the NSMF device obtains a value that is of the network slice performance indicator of the network slice instance and that matches the filtering information specifically includes: obtaining a value that is of the network slice performance indicator and that meets the constraint condition, or obtaining a value that is of the network slice performance indicator and that does not meet the constraint condition.

In a possible solution, the value of the network slice performance indicator includes one or more values of the network slice performance indicator, and that the NSMF device obtains a value that is of the network slice performance indicator and that meets the constraint condition specifically includes: obtaining the one or more values that are of the network slice performance indicator and that meet the constraint condition.

In a possible solution, the value of the network slice performance indicator further includes time corresponding to one or more values of the network slice performance indicator, and that the NSMF device obtains a value that is of the network slice performance indicator and that meets the constraint condition specifically further includes: obtaining the time corresponding to the one or more values that are of the network slice performance indicator and that meet the constraint condition.

In a possible solution, the value of the network slice performance indicator includes one or more values of the network slice performance indicator, and that the NSMF device obtains a value that is of the network slice performance indicator and that does not meet the constraint condition specifically includes: obtaining the one or more values that are of the network slice performance indicator and that do not meet the constraint condition.

In a possible solution, the value of the network slice performance indicator further includes time corresponding to one or more values of the network slice performance indicator, and that the NSMF device obtains a value that is of the network slice performance indicator and that does not meet the constraint condition specifically further includes: obtaining the time corresponding to one or more values that are of the network slice performance indicator and that do not meet the constraint condition.

In a possible solution, the first message further includes an obtaining time range; and that the NSMF device obtains a value that is of the network slice performance indicator of the network slice instance and that matches the filtering information specifically includes: obtaining, within the obtaining time range, the value that is of the network slice performance indicator of the network slice instance and that matches the filtering information.

In a possible solution, the first message further includes an obtaining method; and that the NSMF device obtains, within the obtaining time range, the value that is of the network slice performance indicator of the network slice instance and that matches the filtering information specifically includes: obtaining the value of the network slice performance indicator within the obtaining time range by using the obtaining method.

In a possible solution, the first message is a subscription request message, the second message is a subscription notification message, and the first message further includes an address for receiving data. After receiving the subscription request message from the NSCF device, the NSMF device generates a subscription resource for the network slice instance, and sends the subscription notification message to the NSCF device based on the address for receiving data.

In a possible solution, the method further includes: The NSMF device receives, from the NSCF device, a subscription update request message for updating the subscription resource, where the subscription update request message includes any one or any combination of updated target filtering information, an updated target obtaining time range, an updated target interval time, an updated target obtaining method, and an updated target network slice performance indicator; the NSMF device performs a subscription changing operation on the subscription resource based on the subscription update request message; and the NSMF device sends, to the NSCF device, the value that is of the network slice performance indicator and that exists before the subscription resource changes.

In a possible solution, the method further includes: The NSMF device receives an unsubscription request message related to the subscription resource from the NSCF device; the NSMF device performs an unsubscription operation on the subscription resource based on the unsubscription request message; and the NSMF device sends, to the NSCF device, the value that is of the network slice performance indicator and that exists before unsubscription related to the subscription resource.

In a possible solution, the first message further includes an interval time, and the method further includes: The NSMF device determines, based on the interval time, an interval time between two consecutive times of obtaining the value of the network slice performance indicator. In this solution, the NSMF device may obtain the interval time based on the interval time indicated by the NSCF device, so as to better meet a requirement of the NSCF device for performing charging.

According to a fourth aspect, an embodiment of this application provides a network slice charging function device, including a processor and a memory. The memory is configured to store program instructions, and the processor is configured to: invoke and execute the program instructions stored in the memory, so that the network slice charging function device performs the method for performing charging on a network resource in the second aspect.

According to a fifth aspect, an embodiment of this application provides a computer-readable storage medium, including instructions. When the instructions are run on a computer, the computer is enabled to perform the method for performing charging on a network resource in the second aspect.

According to a sixth aspect, an embodiment of this application provides a network slice management function device, including a processor and a memory. The memory is configured to store program instructions, and the processor is configured to: invoke and execute the program instructions stored in the memory, so that the network slice management device performs the method for performing charging on a network resource in the third aspect.

According to a seventh aspect, an embodiment of this application provides a computer-readable storage medium, including instructions. When the instructions are run on a computer, the computer is enabled to perform the method for performing charging on a network resource in the third aspect.

DESCRIPTION OF EMBODIMENTS

The following describes the technical solutions in the embodiments of this application with reference to the accompanying drawings in the embodiments of this application.

Figure 1:
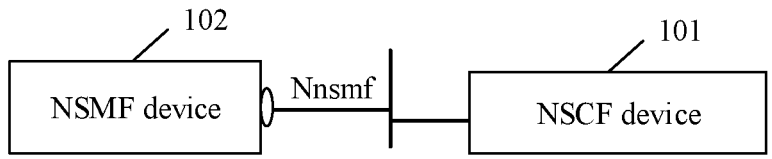
FIG. 1 is an architectural diagram of a charging system according to an embodiment of this application.

FIG. 1 is an architectural diagram of a charging system according to an embodiment of this application. The charging system includes a network slice charging function (NSCF) device 101, a network slice management function (NSMF) device 102, and the like. For ease of description, in the embodiments of this application, the "network slice charging function device" is briefly referred to as an "NSCF device", and the "network slice management function device" is briefly referred to as an "NSMF device". Main functions of the NSCF device and the NSMF device are separately described as follows:

The NSCF device 101 is configured to: determine a network slice performance indicator of a network slice instance and filtering information, subscribe to, from the NSMF device 102 through an interface (Nnsmf is an example identifier of the interface) provided by the NSMF device 102, a value that is of the network slice performance indicator of the network slice instance and that matches the filtering information. Further, when receiving the value that is of the network slice performance indicator of the network slice instance, that matches the filtering information, and that is sent by the NSMF device 102, the NSCF device 101 may perform charging on the network slice instance based on the value that is of the network slice performance indicator of the network slice instance and that matches the filtering information. When the value that is of the network slice performance indicator of the network slice instance, that matches the filtering information, and that is sent by the NSMF device 102 is not received, the NSCF device 101 may determine that the value of the network slice performance of the network slice instance does not match the filtering information, and further perform charging on the network slice instance according to a charging rule corresponding to the network slice performance.

It may be noted that a specific manner of "not receiving the value that is of the network slice performance indicator of the network slice instance, that matches the filtering information, and that is sent by the NSMF device 102" may include: The NSMF device 102 sends a message to the NSCF device 101, where the message does not include the value that is of the network slice performance indicator of the network slice instance and that matches the filtering information. Alternatively, the NSMF device 102 does not send any message to the NSCF device 101 within preset duration. Specific content of the preset duration is not limited in this application. For example, an initial moment of the preset duration may be a moment corresponding to the NSCF device 101 sending the message including the filtering information to the NSMF device 102. A specific value of the preset duration may be set based on an actual empirical value, and is usually less than an obtaining time range. For a specific meaning of the obtaining time range, refer to subsequent solution content in this application. Details are not described herein again.

The network slice performance indicator is used to describe network performance of the network slice instance, and can not only reflect what a customer or a user concerns on using the network slice instance on one aspect or some aspects, but also reflect an investment of an operator on the network slice instance on one aspect or some aspects. The network slice performance indicator may include but is not limited to one or more of the following parameters:

end-to-end latency: The end-to-end latency refers to a transmission latency of a data packet in an access domain, a transmission domain, and a core network domain of the network slice instance;

a quantity of protocol data unit (PDU) sessions: The quantity of protocol data unit sessions refers to a quantity of PDU sessions established on the network slice instance (namely, a quantity of PDU sessions established between user equipment using the network slice instance and a data gateway on the network slice instance);

a bandwidth: The bandwidth refers to a sum of bandwidths used by all concurrent PDU sessions of the network slice instance; and a quantity of users: The quantity of users refers to a quantity of users actually using or concurrently using the network slice instance or a quantity of users registering with the network slice instance.

For ease of description, the network slice performance indicator is also briefly referred to as an "indicator" in the embodiments of this application.

It may be understood that one network slice instance may have one or more network slice performance indicators. A quantity of network slice performance indicators of the network slice instance is not limited in the embodiments of this application.

In specific implementation, the network slice performance indicator transferred by using a message may be represented by a parameter name or a parameter identifier of the indicator. For example, "E2EDelay" or "101" is used to represent a network slice performance indicator "latency". A manner of representing the network slice performance indicator is not limited in the embodiments of this application.

For ease of description, in the embodiments of this application, the parameter name is taken as an example for description.

For ease of understanding of the embodiments of this application, the following further explains a plurality of concepts related to the network slice performance indicator.

(1) Value of the network slice performance indicator: Values of different performance indicators have different meanings. The value of the network slice performance indicator may refer to a specific value obtained by the NSMF device or another device by detecting, sampling, or in other manners on the network slice performance indicator at a moment, within a timeslot, or within a time period (for example, within a minute). The value of the network slice performance indicator may be one value, or may be a plurality of values. For ease of description, in the embodiments of this application, the value of the network slice performance indicator is also referred to as an instantaneous value or a sampling value of the network slice performance indicator.

(2) Time of the network slice performance indicator: The time of the network slice performance indicator refers to a time point, a timeslot, or a time period at which the specific value of the network slice performance indicator is obtained through detection, sampling, or in another manner. For ease of description, in the embodiments of this application, the time of the network slice performance indicator is also referred to as a sampling time of the network slice performance indicator or an obtaining time of the network slice performance indicator, or even directly referred to as the sampling time or the obtaining time. It may be understood that the time/sampling time/obtaining time of the network slice performance indicator may be a specific time point, or may be a specific time period (for example, a minute). For example, an obtaining time of "a quantity of concurrent sessions" may be "2018-10-26 23:58:52", and an obtaining time of "latency" may be "2018-09-26 13:46:00/2018-09-26 13:47:00" or "2018-09-26 13:46".

Based on the foregoing concept, the value of the network slice performance indicator may be one or more values of the network slice performance indicator, or may be a combination of one or more values of the network slice performance indicator and a corresponding time.

The filtering information is used to indicate the NSMF device 102 to send the value that is of the network slice performance indicator of the network slice instance and that matches the filtering information. Specifically, the NSCF device 101 may determine the filtering information with reference to an actual situation and a pre-negotiated charging condition. Usually, the filtering information in this application is different from specific content of the charging condition. Usually, a condition for directly constraining the network slice performance indicator in the charging condition is used as specific content of the filtering information. In addition, when there are a plurality of conditions for directly constraining the network slice performance indicator in the charging condition, the NSCF device 101 may determine specific content of one or more conditions as the filtering information based on priorities or importance degrees of the conditions.

For example, in an actual situation, for the network slice performance indicator "latency", when an actual charging condition is "a quantity of occurrence times that the latency exceeds 50 ms may be less than 10", the charging condition includes two sub-conditions. A first sub-condition is "the latency exceeds 50 ms", and a second sub-condition is "the quantity of occurrence times that the latency exceeds 50 ms may be less than 10". Because the first sub-condition is a condition for directly constraining the latency, the NSCF device 101 may determine "more than 50 ms" in the first sub-condition "the latency exceeds 50 ms" as the specific content of the filtering information.

For another example, in an actual situation, for the network slice performance indicator "bandwidth", when an actual charging condition is "accumulated duration of a bandwidth less than 100M does not exceed 30 hours", the charging condition includes two sub-conditions. A first sub-condition is "the bandwidth less than 100M", and a second sub-condition is "the accumulative duration of the bandwidth less than 100M does not exceed 30 hours". Because the first sub-condition is a condition for directly constraining the bandwidth, the NSCF device 101 may determine "less than 100M" in the first sub-condition "the bandwidth less than 100M" as the specific content of the filtering information.

In this application, the charging condition of the network slice performance indicator is a quantization constraint or a quantization requirement on the value of the network slice performance indicator within an obtaining time range in a related charging rule, and is usually represented by a value range, or may be represented by a specific value. Usually, different charging conditions correspond to different charging rules. For example, a charging condition of the indicator "bandwidth" may be "monthly average bandwidth=100M", or may be "accumulated duration in which the bandwidth is less than 100M does not exceed 30 hours". A charging condition of the indicator "latency" may be "a quantity of occurrence times that the latency exceeds 50 ms is less than 10". In addition, the charging condition of the network slice performance indicator is usually a result of agreement reached by the customer with the operator in a process of subscribing to a network slice instance. In other words, when agreeing on an SLA (service level agreement) for the network slice instance, the operator and the customer may agree on the charging condition of the network slice performance indicator. For example, "the quantity of occurrence times that the latency exceeds 50 ms is less than 10", and "the accumulated duration in which the bandwidth is less than 100G does not exceed 30 hours".

In an actual application process, there may be one or more network slice instances, and each network slice instance may have one or more network slice performance indicators. In this way, the NSMF device 102 needs to spend a large amount of work and space to obtain a value of a network slice performance indicator of a network slice instance. In addition, because a charging condition of each network slice performance indicator of the network slice instance is pre-negotiated based on different application scenarios, that is, the charging condition of each network slice performance indicator is known, to reduce workload of the NSMF device 102, the NSCF device 101 may determine, based on the charging condition of the network slice performance indicator in the network slice instance, filtering information that meets an actual situation, so that the NSMF device 102 obtains a value that is of the network slice performance indicator of the network slice instance and that matches the filtering information, and does not need to obtain values of all network slice performance indicators of the network slice instance. For example, in the conventional technology, the NSMF device 102 needs to obtain the values of all the network slice performance indicators such as "latency" and "bandwidth". However, in this application, the NSMF device 102 may obtain a value whose "latency exceeds 50 ms".

Specifically, when the NSMF device 102 obtains a latency of 20 ms, a latency of 60 ms, a latency of 40 ms, a latency of 70 ms, and a latency of 55 ms, the NSMF device 102 may filter out "the latency of 20 ms and the latency of 40 ms" based on "latency" and "more than 50 ms" received from the NSCF device 101, and send "the latency of 60 ms, the latency of 70 ms, and the latency of 55 ms" to the NSCF device 101 in a form of sampling specific content, an identifier, code, a binary value, or the like. Alternatively, the NSMF device 102 may filter out "the latency of 60 ms, the latency of 70 ms, and the latency of 55 ms" based on "latency" and "more than 50 ms" received from the NSCF device 101, and may send "the latency of 20 ms and the latency of 40 ms" to the NSCF device 101 in a form of sampling specific content, an identifier, code, a binary value, or the like. In this way, the filtering information performs a function of filtering the value of the network slice performance indicator.

Further, when receiving the filtering information, the NSMF device 102 may selectively obtain the value that is of the network slice performance indicator of the network slice instance and that matches the filtering information, and does not need to obtain the values of all the network slice performance indicators of the network slice instance. Therefore, data processing pressure and data storage pressure of the NSMF device 102 are reduced, and the NSCF device 101 may receive, from the NSMF device 102, a required value that is of the network slice performance indicator of the network slice instance and that matches the filtering information, and does not need to receive the values of all the network slice performance indicators of the network slice instance. In this way, data processing pressure and data storage pressure of the NSCF device 101 are reduced, data transmission pressure between the NSMF device 102 and the NSCF device 101 is reduced, and respective processing performance of the NSMF device 102 and the NSCF device 101 is improved.

The following describes in detail a specific representation manner of the filtering information in three feasible implementations. It may be noted that the specific representation manner of the filtering information is not limited to the foregoing two manners.

In a feasible implementation, the filtering information may include a first indication identifier, and the NSMF device 102 may send, to the NSCF device 101 by using the first indication identifier, a value that is of the network slice performance indicator of the network slice instance and that corresponds to a first constraint condition, where the first constraint condition is a constraint condition of the network slice performance indicator stored in the NSMF device 102.

The first constraint condition is pre-negotiated by the NSCF device 101 and the NSMF device 102 based on actual experience, and may be directly determined based on a condition (a sub-condition) of the network slice performance indicator in the charging condition. The first constraint condition may be a constraint condition of one or more network slice performance indicators of any network slice instance, or may be a combination of constraint conditions of network slice performance indicators of a plurality of network slice instances. This is not limited in this application.

For example, the first constraint condition may be specifically that a network slice performance indicator "latency" in a network slice instance 1 is "more than 50 ms". The first constraint condition may alternatively be that a network slice performance indicator "latency" in a network slice instance 1 is "more than 50 ms", and a network slice performance indicator "bandwidth" in the network slice instance 1 is "less than 100G". The first constraint condition may further be that a network slice performance indicator "latency" in a network slice instance 1 is "more than 50 ms", and a network slice performance indicator "bandwidth" in a network slice instance 2 is "less than 100G".

The NSCF device 101 and the NSMF device 102 may pre-negotiate to indicate the first constraint condition by using the first indication identifier, so that when receiving the first indication identifier, the NSMF device 102 may determine a corresponding first constraint condition, and then obtain the value that is of the network slice performance indicator of the network slice instance and that corresponds to the first constraint condition, for example, obtain a value of the network slice performance indicator "latency" that is "more than 50 ms", or a value and a time of the network slice performance indicator "latency" that is "more than 50 ms".

Alternatively, the NSCF device 101 and the NSMF device 102 may pre-negotiate an association relationship between a constraint condition and an indication identifier, so that when receiving the first indication identifier, the NSMF device 102 may determine, based on the association relationship between a constraint condition and an indication identifier, the first constraint condition corresponding to the first indication identifier, and then obtain the value that is of the network slice performance indicator of the network slice instance and that corresponds to the first constraint condition, for example, obtain a value of the network slice performance indicator "bandwidth" that is "less than 100G", or a value and a time of the network slice performance indicator "bandwidth" that is "less than 100G".

The association relationship between the first constraint condition and the first indication identifier may be specifically stored in a form of a table or a number column. Optionally, the first indication identifier may be represented in various forms, such as a number, code, a letter, or a binary value, and the first indication identifier may be associated with one or more first constraint conditions. This is not limited in this application. For example, a number 1 is associated with a first constraint condition 1, and a letter A is associated with the first constraint condition 1 and a first constraint condition 2.

The NSMF device 102 may obtain a value that is of the network slice performance indicator of the network slice instance and that meets the first constraint condition, or may obtain a value that is of the network slice performance indicator of the network slice instance and that does not meet the first constraint condition. For example, when the NSMF device 102 obtains the first constraint condition "less than 100G" that corresponds to the first indication identifier and that is of the network slice performance indicator "bandwidth", the NSMF device 102 may obtain a value of "bandwidth less than 100G", or may obtain a value of "bandwidth greater than 100G". A specific obtaining process may be determined according to a prior agreement between the NSCF device 101 and the NSMF device 102.

In another feasible implementation, the filtering information may include a second indication identifier and a second constraint condition, and the NSMF device 102 may send, to the NSCF device 101 by using the second indication identifier, a value that is of the network slice performance indicator of the network slice instance and that corresponds to the second constraint condition.

The NSCF device 101 and the NSMF device 102 may pre-negotiate whether the first indication identifier and the second indication identifier use a same representation manner. When the first indication identifier and the second indication identifier use the same representation manner, the NSMF device 102 may determine whether the filtering information includes only the indication identifier, to distinguish the first indication identifier from the second indication identifier. When the first indication identifier and the second indication identifier use different representation manners, the NSMF device 102 may directly distinguish between the first indication identifier and the second indication identifier.

The second constraint condition is that the NSCF device 101 directly determines a condition (a sub-condition) of the network slice performance indicator based on a current actual requirement and the charging condition, and may be the same as specific content of the first constraint condition, or may be different from specific content of the first constraint condition. This is not limited in this application. In addition, the second constraint condition may be specific content of the constraint condition, or may alternatively represent specific content of the constraint condition in a form of an identifier, code, a binary value, or the like.

Further, when receiving the second indication identifier and the second constraint condition, the NSMF device 102 may obtain the value that is of the network slice performance indicator of the network slice instance and that corresponds to the second constraint condition, for example, obtain a value of the network slice performance indicator "bandwidth" that is "less than 100G", or a value and a time of the network slice performance indicator "bandwidth" that is "less than 100G".

The NSMF device 102 may obtain a value that is of the network slice performance indicator of the network slice instance and that meets the second constraint condition, or may obtain a value that is of the network slice performance indicator of the network slice instance and that does not meet the second constraint condition. For example, when the NSMF device 102 obtains the second constraint condition "less than 100G" that corresponds to the second indication identifier and that is of the network slice performance indicator "bandwidth", the NSMF device 102 may obtain a value of "bandwidth less than 100G", or may obtain a value of "bandwidth greater than 100G". A specific obtaining process may be determined according to a prior agreement between the NSCF device 101 and the NSMF device 102.

In another feasible implementation, the filtering information may include a third constraint condition, so that the NSMF device 102 may send, to the NSCF device 101, a value that is of the network slice performance indicator of the network slice instance and that corresponds to the third constraint condition.

In this application, the NSCF device 101 and the NSMF device 102 may pre-negotiate a location at which the third constraint condition is located in the filtering information, for example, fixed storage space in the filtering information, or a fixed bit of a message body in the filtering information. In this way, the NSCF device 101 may directly obtain the constraint condition from the corresponding location of the filtering information.

The third constraint condition may be specific content of the constraint condition, or may alternatively represent specific content of the constraint condition in a form of an identifier, code, a binary value, or the like. In addition, the third constraint condition is that the NSCF device 101 directly determines a condition (a sub-condition) of the network slice performance indicator based on a current actual requirement and a charging condition, and specific content of the third constraint condition may be the same as specific content of the first constraint condition and the second constraint condition. Alternatively, specific content of the third constraint condition may be different from specific content of the first constraint condition and the second constraint condition.

Further, when receiving the third constraint condition, the NSMF device 102 may obtain the value that is of the network slice performance indicator of the network slice instance and that corresponds to the third constraint condition, for example, obtain a value of the network slice performance indicator "bandwidth" that is "less than 100G", or a value and a time of the network slice performance indicator "bandwidth" that is "less than 100G".

The NSMF device 102 may obtain a value that is of the network slice performance indicator of the network slice instance and that meets the third constraint condition, or may obtain a value that is of the network slice performance indicator of the network slice instance and that does not meet the third constraint condition. For example, when the NSMF device 102 obtains the third constraint condition "less than 100G" of the network slice performance indicator "bandwidth", the NSMF device 102 may obtain a value of "bandwidth less than 100G", or may obtain a value of "bandwidth greater than 100G". A specific obtaining process may be determined according to a prior agreement between the NSCF device 101 and the NSMF device 102.

Optionally, the NSCF device may determine the first constraint condition and the second constraint condition based on the charging condition of the network slice performance indicator of the network slice instance, where the network slice performance indicator may be determined based on subscription information, of a customer, for subscribing to the network slice instance or configuration information preset by an operator. In addition, the subscription information or the preset configuration information may usually further include the charging condition and the charging rule of the network slice performance indicator. The subscription information includes any one or any combination of a service level agreement term, a network slice type, a network slice template, or subscription duration of the network slice instance.

Further, the NSMF device 102 may perform charging on the network slice instance based on the value that is of the network slice performance indicator and that matches the filtering information. Specifically, a specific process of the charging may include: generating a network slice charging data record based on the value that is of the network slice performance indicator and that matches the filtering information, or calculating a fee for use of the network slice instance based on the value that is of the network slice performance indicator and that matches the filtering information. The method for calculating the fee for use of the network slice instance based on the value that is of the network slice performance indicator and that matches the filtering information may include: obtaining a charging rule related to the network slice instance, and calculating the fee for use of the network slice instance based on the value that is of the network slice performance indicator and that matches the filtering information and according to the charging rule.

In addition, when the NSCF device 101 does not obtain the value that is of the network slice performance indicator and that matches the filtering information, because the filtering information is sent by the NSCF device 101 to the NSMF device 102, the NSMF device 102 may determine that a current value of the network slice performance indicator of the network slice instance does not match the filtering information, and further may perform charging on the network slice instance according to the charging rule corresponding to the network slice performance indicator. Specifically, a specific process of the charging may include: generating a network slice charging data record according to the charging rule, or calculating a fee for use of the network slice instance according to the charging rule.

Optionally, the NSCF device 101 further sends a charging result to a billing system (not shown in FIG. 1), so that the billing system generates a charging data record for the customer.

It may be understood that an actual physical device on which the NSCF device 101 is deployed is not limited in the embodiments of this application. For example, the NSCF device 101 may be independently deployed, or may be deployed on a converged charging function server or another physical device. For example, the NSCF device 101 may be used as a built-in module of a charging function (CHF) device, to add a network slice instance charging function to the CHF device.

The NSMF device 102 is configured to: provide, for the NSCF device 101, the value that is of the network slice performance indicator of the network slice instance and that matches the filtering information, including: receiving a subscription request about the network slice performance indicator of the network slice instance and the filtering information, obtaining the value that is of the network slice performance indicator and that matches the filtering information, and sending, to the NSCF device 101 by using a subscription notification, the value that is of the network slice performance indicator and that matches the filtering information. The NSMF device 102 may be a cross-domain slice manager or a slice manager of a core network subdomain.

It may be understood that an actual physical device on which the NSMF device 102 is deployed is not limited in this application. For example, the NSMF device 102 may be independently deployed, or may be deployed on a physical device having another function. For example, a policy control function (PCF) device and a slice management function (SMF) device are used as the NSMF device 102.

If the NSMF device 102 uses a combination of the PCF device and the SMF device, when the NSCF device 101 is independently deployed, an interface exists between the SMF device and the CHF device. The NSCF device 101 sends a subscription request to the SMF device by using the CHF device. The SMF device sends a subscription notification to the NSCF device 101 by using the CHF device. When the NSCF device 101 is disposed on the CHF device, the CHF device sends a subscription request to the SMF device, and the SMF device sends a subscription notification to the CHF device. After the CHF device performs network slice instance charging, a rating function (RF) device performs rating.

For the foregoing specific content, further refer to subsequent embodiments in this application.

Figure 2:
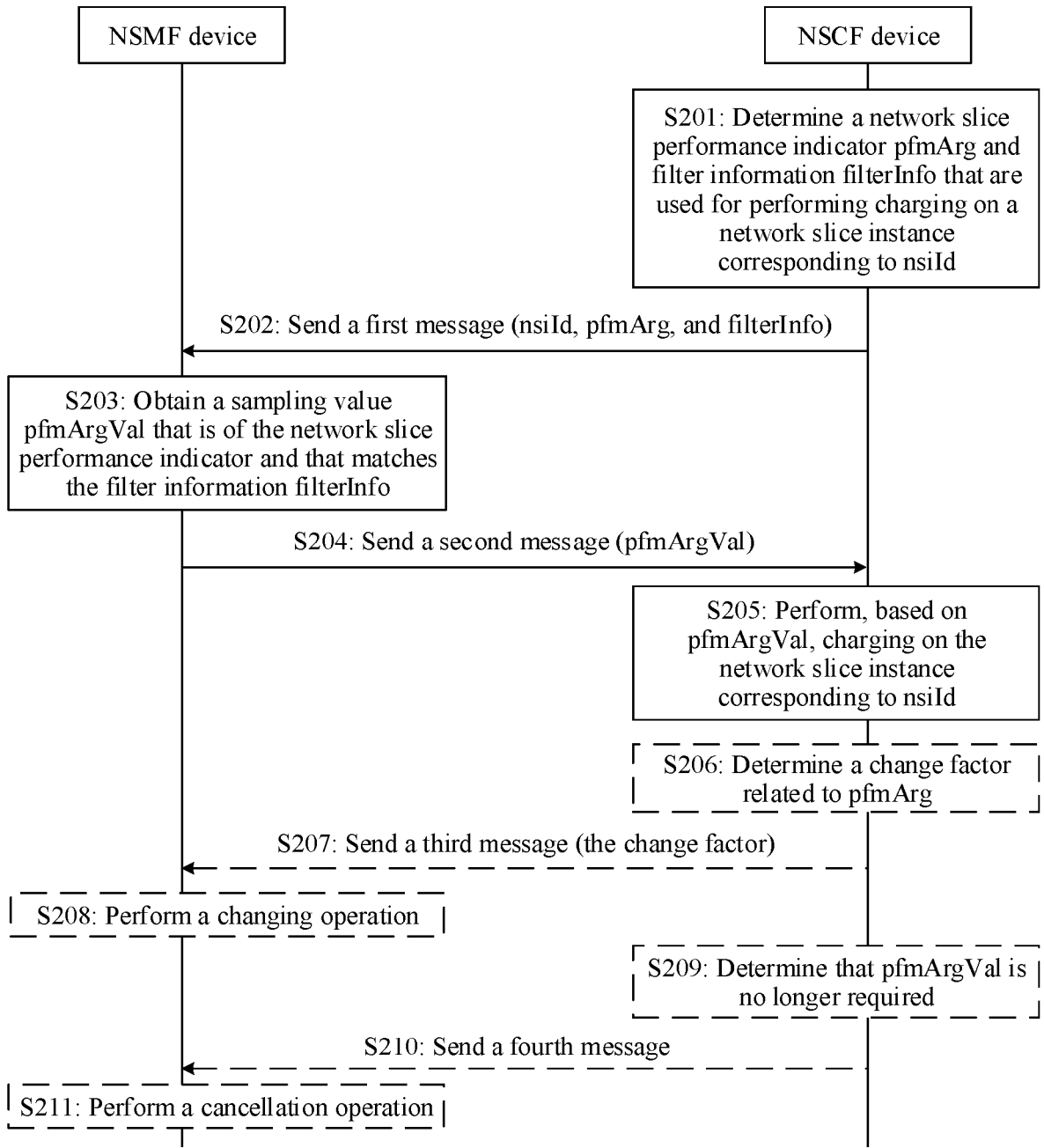
FIG. 2 is a flowchart of a method for performing charging on a network resource according to an embodiment of this application.

FIG. 2 is a flowchart of a method for performing charging on a network resource according to an embodiment of this application. A procedure of the method is implemented based on the architecture in FIG. 1. An NSMF device corresponds to the NSMF device 102 in FIG. 1, and an NSCF device corresponds to the NSCF device 101 in FIG. 1. The method procedure specifically includes the following steps.

Step 201: the NSCF device determines a network slice performance indicator pfmArg and filter information filterInfo that are used for performing charging on a network slice instance corresponding to nsiId.

Specifically, before performing charging on the network slice instance (assuming that an identifier of the network slice instance is nsiId), the NSCF device may determine the network slice performance indicator pfmArg that needs to be used for performing charging on the network slice instance, and determine, based on a charging condition of the network slice performance indicator pfmArg, the filtering information (assuming that an identifier of the filtering information is filterInfo) that meets an actual situation.

Optionally, the NSCF device may first determine the network slice performance indicator pfmArg. For example, the NSCF device may obtain the network slice performance indicator from subscription information related to subscription to the network slice instance by a customer, or may obtain the network slice performance indicator from configuration information preset by an operator. A manner of obtaining the network slice performance indicator by the NSCF device is not limited in the embodiments of this application.

Further, the NSCF device may determine, based on the charging condition of pfmArg, the filtering information that meets the actual situation. For example, if a pre-negotiated charging condition is "a quantity of occurrence times that a latency exceeds 50 ms may be less than 10", the NSCF device may use "more than 50 ms" as the filtering information in a form of specific content, a number, code, a letter, or a binary value for the network slice performance indicator "latency", so that the NSMF device obtains a value whose "latency exceeds 50 ms", or a value and a time whose "latency exceeds 50 ms", and does not obtain a value whose "latency is less than 50 ms", or other data (the other data includes another network slice performance indicator or latency-related data other than "the latency less than 50 ms") other than the value and the time.

It may be understood that when the customer subscribes to or uses a plurality of network slice instances, the NSCF device may need to perform charging on the plurality of network slice instances. In this step, different network slice performance indicators of the plurality of network slice instances may be determined (considering that types of different network slice instances may be different, and correspondingly, network slice performance indicators may also be different). Therefore, a quantity of network slice instances is not limited in the embodiments of this application. However, for ease of description, in the embodiments of this application, a single network slice instance is taken as an example for description.

It may be further understood that, when the single network slice instance is taken as an example, based on a requirement of the customer or the operator or a type of the single network slice instance, only a single network slice performance indicator or a plurality of network slice performance indicators may be used in a process of performing charging on the single network slice instance. Therefore, a quantity of network slice performance indicators is not limited in the embodiments of this application. However, for ease of description, in the embodiments of this application, a single network slice performance indicator is mainly taken as an example for description.

Step 202: the NSCF device sends a first message to the NSMF device, where the first message includes nsiId, pfmArg, and filterInfo.

Specifically, the NSCF device includes the identifier nsiId of the network slice instance, the network slice performance indicator pfmArg, and filterInfo in the first message, and sends the first message to the NSMF device, to request the NSMF device to provide a value that is of the network slice performance indicator pfmArg of the network slice instance and that matches the filter information filterInfo.

The network slice performance indicator pfmArg is an optional parameter, and may be a name of the network slice performance indicator. When the first message does not include the parameter, the parameter may be represented by using the filter information filterInfo. For example, the filter information may be "latency more than 50 ms", where the "latency" becomes a corresponding network slice performance indicator. In addition, the filtering information corresponding to the network slice performance indicator "latency" may alternatively be "more than 50 ms". For ease of description, the filtering information is described in this manner as an example in this application. The identifier nsiId of the network slice instance may be s-NSSAI (single network slice selection assistance information, single network slice selection assistance information) of the network slice instance, or may be other information used to identify the network slice instance. This is not limited in the embodiments of this application. For ease of description, the s-NSSAI is taken as an example for description in the embodiments of this application. Details are not described subsequently.

Optionally, the NSCF device may further include an address for receiving data in the first message, so that the NSMF device may subsequently send, to the NSCF device based on the address, the value that is of the network slice performance indicator of the network slice instance and that matches the filtering information.

Optionally, the NSCF device may further include an obtaining time range in the first message, so that the NSMF device obtains a value of the network slice performance indicator pfmArg within the obtaining time range. The obtaining time range may be determined based on information such the subscription information of the customer or an account balance of the customer.

Further, the NSCF device may further include an obtaining method in the first message, so that the NSMF device obtains, by using the obtaining method, the value of the network slice performance indicator pfmArg within the obtaining time range. The obtaining method may represent an obtaining frequency for obtaining any value that is of the network slice performance indicator pfmArg and that matches the filtering information, or an obtaining frequency and an interval time. The obtaining frequency refers to a preset quantity of times of obtaining the value within a preset time, and the interval time is a time interval between two adjacent obtaining of the value. A specific value of the obtaining frequency or the interval time may be limited based on an actual situation.

For example, it is assumed that the obtaining time range is 1 hour, the obtaining method is set to an obtaining frequency of obtaining once every second, and a value obtained each time is used as a value of the network slice performance indicator pfmArg.

For another example, it is assumed that the obtaining time range is 1 hour, the obtaining method is set to an obtaining frequency of obtaining once every second, and an average/maximum/minimum value of values obtained every two consecutive times is used as a value of the network slice performance indicator pfmArg.

For another example, it is assumed that the obtaining time range is 1 hour, the obtaining method is set to an obtaining frequency of obtaining once every second, and an average/maximum/minimum value of values obtained every two consecutive times is used as a value of the network slice performance indicator pfmArg. An interval time between the values of the network slice performance indicator pfmArg is duration of an interval time between obtaining two values of the network slice performance indicator pfmArg.

Optionally, the first message may be a subscription request message. The subscription request message is used to request the NSMF device to create a subscription resource for the network slice instance. The subscription resource is used to manage a subscription (including querying, updating, and deleting the subscription). The subscription resource has a unique identifier, and the identifier may be generated based on the subscription request message when the NSMF device receives the subscription request message, or may be carried in the subscription request message after the NSCF device generates the identifier. The NSMF device obtains, based on the subscription resource, the value that is of the network slice performance indicator and that matches the filtering information, and generates and sends a subscription notification message. The NSMF device may send the subscription notification message to the NSCF device based on the address for receiving data. Optionally, the subscription resource may include the filtering information, where the filtering information may be specifically represented by using an identifier, code, or another form. This is not limited in this application, so that the NSMF device distinguishes corresponding filtering information in different scenarios.

It may be understood that when the NSCF device needs to perform charging on a plurality of network slice instances, the first message may include a plurality of network slice instance identifiers and one or more corresponding network slice performance indicators.

It may be further understood that when the NSMF device maintains a correspondence between the customer and the network slice instance of the customer, nsiId may be replaced with a customer identifier, or may be replaced with a combination of the customer identifier and an identifier that is of the network slice instance and that corresponds to the customer identifier.

Step 203: the NSMF device obtains the value pfmArgVal that is of the network slice performance indicator and that matches the filter information filterInfo.

Specifically, after receiving the first message, the NSMF device performs the following operations based on nsiId, pfmArg, and filterInfo in the first message: obtaining the value pfmArgVal that is of the network slice performance indicator pfmArg in the network slice instance whose identifier is nsiId and that matches the filter information filterInfo.

If the first message does not include pfmArg, the NSMF device determines, based on the filter information filterInfo, pfmArg indicated by the filter information filterInfo. Specifically, the NSMF device may determine pfmArg based on an association relationship between the filter information filterInfo and pfmArg, where the association relationship is pre-negotiated by the NSMF device and the NSCF device, and the association relationship may be prestored in the NSMF device in a form of a list, a sequence, or the like.

pfmArgVal may be the value that is of the network slice performance indicator and whose name corresponds to pfmArg and that matches the filter information filterInfo, or a combination of a value and a time. This is further separately described in subsequent embodiments of this application.

It may be understood that, after receiving the first message, the NSMF device correspondingly returns a response message of the first message.

Step 204: the NSMF device sends a second message to the NSCF device, where the second message includes pfmArgVal.

Specifically, when obtaining pfmArgVal, the NSMF device may include the obtained pfmArgVal in the second message, and send the second message to the NSCF device.

Optionally, the NSMF device may send pfmArgVal to the NSCF device based on the address for receiving the data in step 202.

It may be understood that if the first message is a subscription message, the second message is a subscription notification message.

Step 205: the NSCF device performs, based on pfmArgVal, charging on the network slice instance corresponding to nsiId.

Specifically, after receiving the second message, that the NSCF device performs charging on the network slice instance whose identifier is nsiId based on the value pfmArgVal that is of the network slice performance indicator and that is provided by the NSMF device and included in the second message may be specifically: generating a network slice charging data record based on pfmArgVal, or directly calculating a fee for use of the network slice instance based on pfmArgVal, where pfmArgVal may be a value or a combination of a value and a time.

When the pfmArgVal is the combination of the value and the time of pfmArg, the NSCF device may write each combination of the value and the time into the charging data record of the network slice instance corresponding to nsiId, and subsequently perform fee calculation based on the charging data record. Alternatively, the NSCF device may further determine a corresponding obtaining time range and a corresponding obtaining method, and calculate, by using the obtaining method and based on a plurality of combinations of values and times in the charging data record, the fee for use of the network slice instance corresponding to nsiId.

Optionally, the NSCF device may first obtain a related charging rule, and then calculate the fee for use of the network slice instance according to the charging rule and the plurality of combinations of values and times. For example, it is assumed that the charging rule configured by the operator for the network slice instance is "if accumulated end-to-end latency exceeds 50 ms for more than 10 times, a monthly rental is reduced by half". If pfmArg is "latency", and a quantity of times that "if the accumulated end-to-end latency exceeds 50 ms for more than 10 times, the monthly rental is reduced by half" is "11 times", which is obtained based on the plurality of combinations of values and times, use of the network slice instance is charged at a charging rate of 50%. Optionally, the NSCF device may obtain the charging rule from the subscription information of the customer. Calculation of the fee for use is further described in subsequent embodiments of this application.

It may be understood that, after receiving the second message, the NSCF correspondingly returns a response message of the second message.

Step 206: the NSCF device determines a change factor related to pfmArg.

This step is an optional step. Specifically, when receiving subscription change information of the customer or the like, the NSCF device may determine the change factor related to the network slice performance indicator pfmArg. The change factor includes but is not limited to: a change of the filtering information, a change of the obtaining time range, a change of the obtaining method, a change of the network slice performance indicator, or the like.

Step 207: the NSCF device sends a third message to the NSMF device, where the third message includes the change factor.

This step is an optional step. Specifically, after determining the change factor, the NSCF device may send the change factor to the NSMF device by using the third message, so that the NSMF device performs a corresponding change based on the third message, to meet a requirement of the NSCF device for subsequently performing charging.

It may be understood that if the first message is the subscription message, the third message is a subscription update request message for a subscription resource. The subscription update request message is used to change the subscription resource. The subscription update request message includes any one or any combination of a target obtaining time range, a target interval time, a target obtaining method, and a target network slice performance indicator.

Step 208: the NSMF device performs a changing operation.

This step is an optional step. Specifically, the NSMF device receives the third message, and performs the changing operation based on the change factor in the third message, for example, adjusts the obtaining time range or changes the obtaining method.

After performing the changing operation, the NSMF device sends, to the NSCF device, the value that is of the network slice performance indicator and that exists before the changing operation.

It may be understood that, after receiving the third message, the NSMF correspondingly returns a response message of the third message.

If the first message is the subscription message, the NSMF sends, to the NSCF device, the value that is of the network slice performance indicator and that matches the filtering information and that exists before the subscription resource changes. Specifically, the NSMF device may add, to a response message of the subscription update request message, the value that is of the network slice performance indicator and that matches the filtering information and that exists before the subscription resource changes, or the response message of the subscription update request message does not carry the value that is of the network slice performance indicator and that matches the filtering information and that exists before the subscription resource changes, but after sending the response message, the NSMF device sends, to the NSCF device, a notification message that carries the value that is of the network slice performance indicator and that matches the filtering information and that exists before the subscription resource changes.

Step 209: the NSCF device determines that pfmArgVal is no longer needed.

This step is an optional step. Specifically, when it is determined that the subscription of the customer is about to expire or has expired, the NSCF device may determine that pfmArgVal is no longer needed.

Step 210: the NSCF device sends a fourth message to the NSMF device.

This step is an optional step. Specifically, after determining that pfmArgVal is no longer needed, the NSCF device may send the fourth message to the NSMF device, to indicate to the NSMF device that pfmArgVal is no longer needed.

If the first message is the subscription message, the fourth message is an unsubscription request message related to the subscription resource.

Step 211: the NSMF device performs a cancellation operation.

This step is an optional step. Specifically, the NSMF device receives the fourth message, and performs the cancellation operation, for example, stops or deletes a task created for obtaining pfmArgVal.

It may be understood that, after receiving the fourth message, the NSMF correspondingly returns a response message of the fourth message.

If the first message is the subscription message, the NSMF device sends, to the NSCF device, the value that is of the network slice performance indicator and that matches the filtering information and that exists before unsubscription related to the subscription resource. Specifically, the NSMF device may add, to a response message of the unsubscription request message, the value that is of the network slice performance indicator and that matches the filtering information and that exists before unsubscription related to the subscription resource, or the response message of the unsubscription request message does not carry the value that is of the network slice performance indicator and that matches the filtering information and that exists before unsubscription related to the subscription resource, but after sending the response message, the NSMF device sends, to the NSCF device, a notification message that carries the value that is of the network slice performance indicator and that matches the filtering information and that exists before unsubscription related to the subscription resource.

Compared with a conventional linear charging method that is merely based on terminal service data (such as traffic or duration), in the method for performing charging on a network slice instance corresponding to FIG. 2, a charging condition of a network slice performance indicator of each network slice instance is pre-negotiated, and each network slice performance indicator meets a different charging condition in different scenarios. Therefore, to reduce workload of the NSMF device, the NSCF device may determine, based on the charging condition of the network slice performance indicator in the network slice instance, the filtering information that meets an actual situation, so that the NSMF device can obtain the value that is of the network slice performance indicator of the network slice instance and that matches the filtering information, and does not need to obtain values of all network slice performance indicators of the network slice instance. Therefore, the NSCF device may perform charging on the network slice instance based on the value that is of the network slice performance indicator, that matches the filtering information, and that is sent by the NSMF device, so as to avoid a waste of network resources, help improve a network resource utilization rate or improve quality of service of a network service, reduce an amount of data transmitted between the NSCF device and the NSMF device, and reduce transmission pressure and storage load of the NSCF device and the NSMF device.

In an actual application process, the value pfmArgVal of the network slice performance indicator may not match the filter information filterInfo. For example, in an obtaining time period, if "the latency is less than 50 ms", the NSMF cannot obtain pfmArgVal, and if "the latency exceeds 50 ms", the NSMF device may obtain pfmArgVal. In this application, when the NSCF device does not obtain pfmArgVal, because the filter information filterInfo is determined by the NSCF device, the NSCF device may determine that the value pfmArgVal of the network slice performance indicator of the network slice instance does not match the filter information filterInfo, and further may perform charging according to a charging rule (for example, a default charging rule) corresponding to the network slice performance indicator.

In this application, when receiving the value that is of the network slice performance indicator, that matches the filtering information, and that is provided by the NSMF device, the NSCF device may perform charging on the network slice instance based on the value that is of the network slice performance indicator and that matches the filtering information. When the NSCF device does not receive the value that is of the network slice performance indicator, that matches the filtering information, and that is provided by the NSMF device, the NSCF device may perform charging on the network slice instance according to the charging rule corresponding to the network slice performance indicator, so that the NSMF device does not need to collect values of all network slice performance indicators. In this way, an amount of data transmitted between the NSMF device and the NSCF device is reduced, so as to avoid frequent data transmission between the NSMF device and the NSCF device, reduce communication bandwidth occupation between the NSMF device and the NSCF device, reduce calculation load of charging performed by the NSCF device, and improve performance of the NSCF device.

In addition, the NSMF device may alternatively store the values of all the network slice performance indicators, and may first compress the values of all the network slice performance indicators when a network resource is idle, and then send the compressed values of all the network slice performance indicators to the NSCF device, so that the NSCF device can obtain the values of all the network slice performance indicators for subsequent processing. Because the network slice performance indicator is data that the customer cares about, and can better reflect an investment of the operator, a matching degree between a charging result of the customer and a network resource investment is improved, the foregoing diversified application scenarios are facilitated, and diversified network service requirements of industry customers are met.

Figure 3:
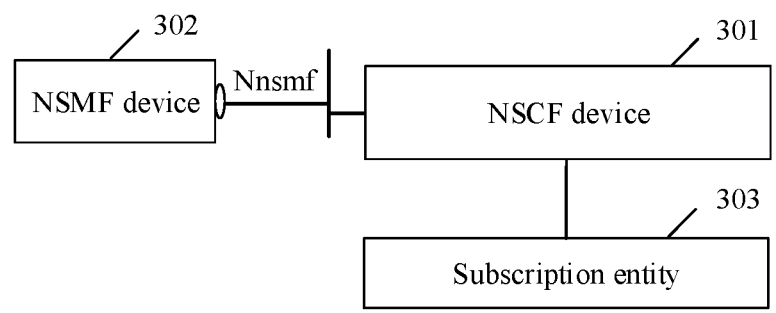
FIG. 3 is an architectural diagram of another charging system according to an embodiment of this application.

FIG. 3 is an architectural diagram of another charging system according to an embodiment of this application. The charging system includes an NSCF device 301 (corresponding to the NSCF device 101 in FIG. 1), an NSMF device 302 (corresponding to the NSMF device 102 in FIG. 1), and a subscription entity 303. Brief functions of the NSCF device 301, the NSMF device 302, and the subscription entity 303 are separately described as follows:

The NSCF device 301 is deployed on a convergent charging server or deployed independently, and is configured to: obtain information about a network slice instance and subscription information of a customer from the subscription entity 303; determine a network slice performance indicator, an obtaining time range, and an obtaining method based on the subscription information; subscribe to, from the NSMF device 302, a value that is of the network slice performance indicator of the network slice instance and that matches filtering information; when the value that is of the network slice performance indicator and that matches the filtering information is received, perform charging on the network slice instance based on the subscription information and the value that is of the network slice performance indicator and that matches the filtering information; and when the value that is of the network slice performance indicator and that matches the filtering information is not received, perform charging on the network slice instance based on the subscription information.

It may be understood that the NSMF device 302 may send the information about the network slice instance to the NSCF device 301 by using the subscription entity 303, or the NSMF device 302 may directly send the information about the network slice instance to the NSCF device 301, for example, an identifier of the network slice instance, a creation time of the network slice instance, and a current status (for example, created or activated) of the network slice instance.

The NSMF device 302 is configured to provide, to the NSCF device 301, the value that is of the network slice performance indicator of the network slice instance and that matches the filtering information.

The subscription entity 303 is configured to receive a network slice subscription request from the customer, notify the NSMF device 302 to enable the network slice instance, and send the subscription information and the information about the network slice instance to the NSCF device 301, so that the NSCF device 301 can perform charging on the network slice instance. The subscription entity 303 is a functional module, and may be deployed on a CRM (Customer Relationship Management) server, or may be deployed on another device.

Figure 4A:
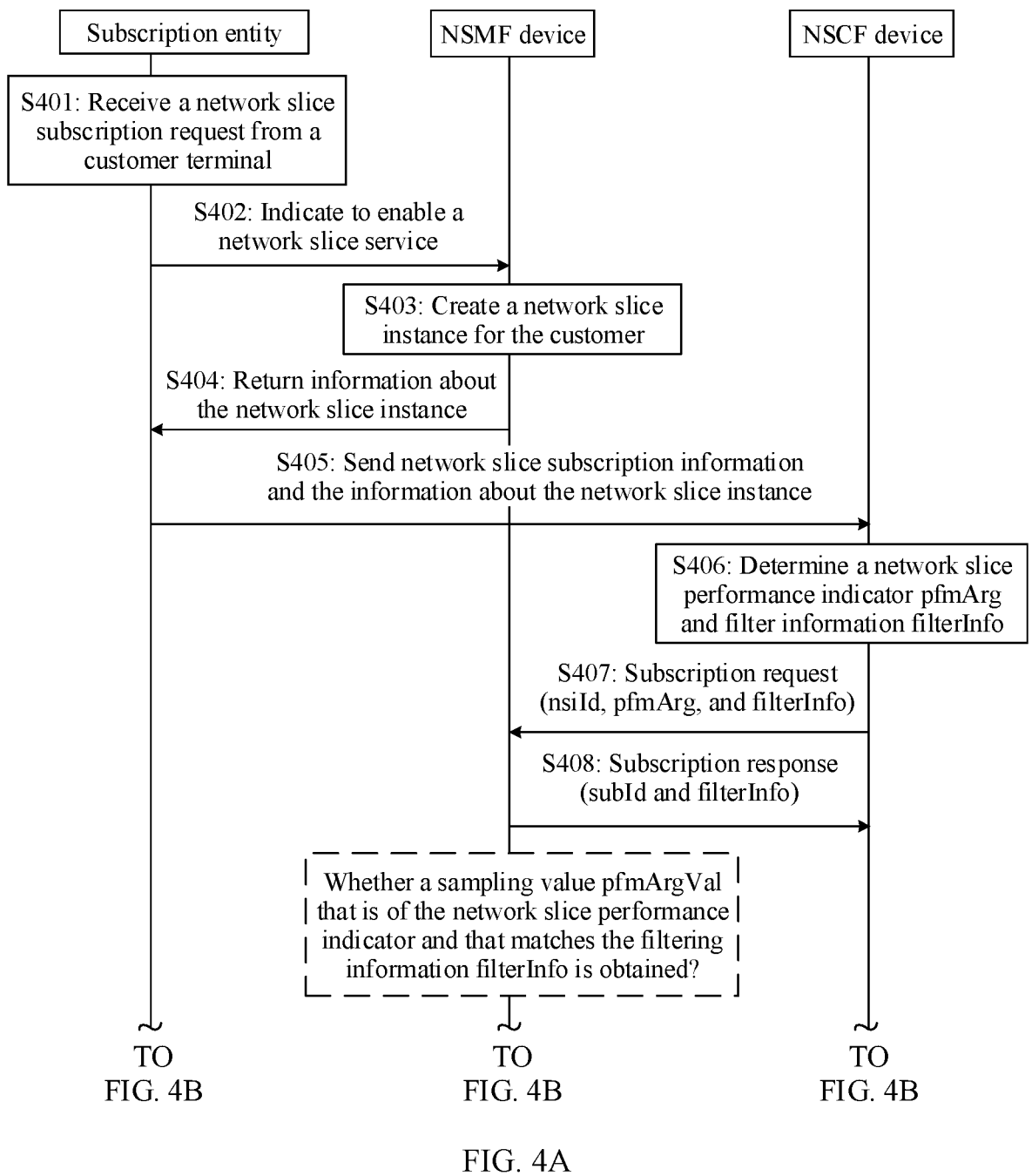
FIG. 4A and FIG. 4B are a flowchart of another method for performing charging on a network resource according to an embodiment of this application.
Figure 4B:
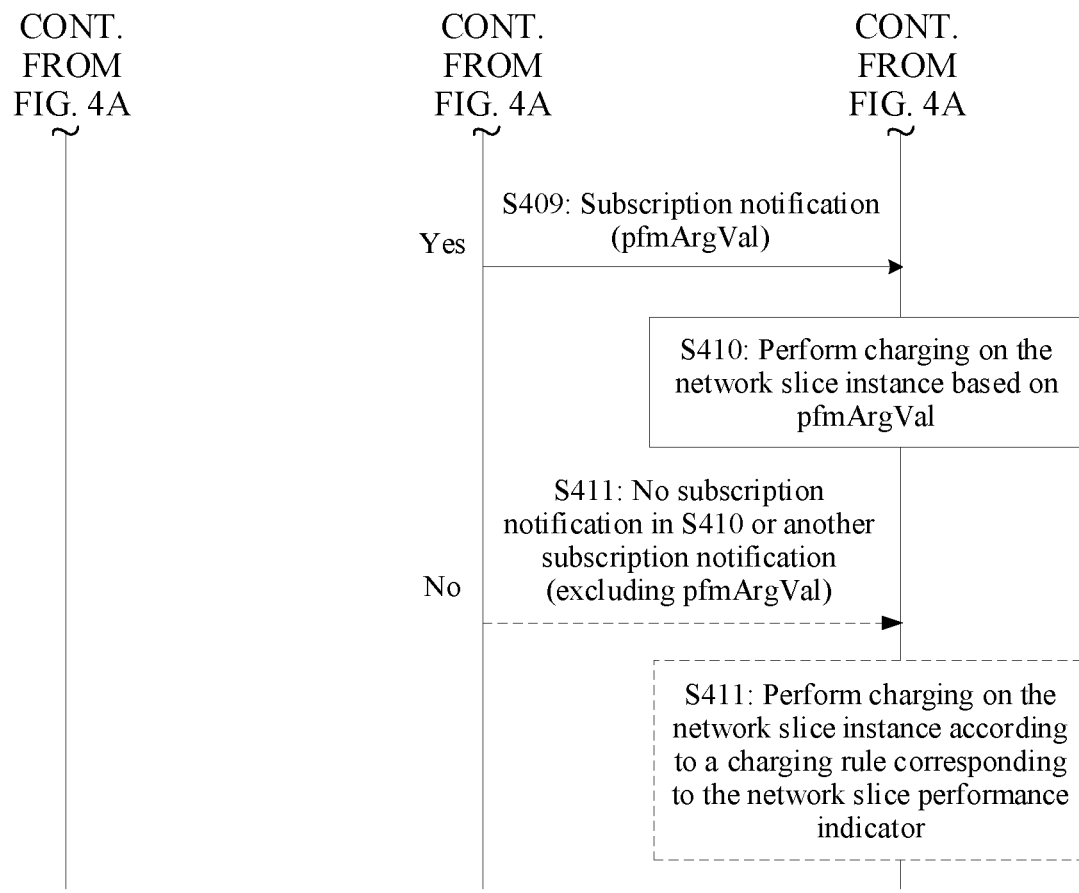

FIG. 4A and FIG. 4B are a flowchart of another method for performing charging on a network resource according to an embodiment of this application. A procedure of the method is implemented based on the architecture shown in FIG. 3. An NSMF device corresponds to the NSMF device 302 in FIG. 3, an NSCF device corresponds to the NSCF device 301 in FIG. 3, and a subscription entity corresponds to the subscription entity 303 in FIG. 3. In the method procedure, the NSMF device transmits, to the NSCF device, a value that is of a network slice performance indicator and that matches the filtering information, and then the NSCF device performs charging on a network slice instance based on the received value of the network slice performance indicator. In addition, when the NSCF device does not receive the value of the network slice performance indicator, the NSCF device performs charging on the network slice instance according to a charging rule corresponding to the network slice performance indicator. The following steps are specifically included.

Step 401: the subscription entity receives a network slice subscription request.

Specifically, a customer (assuming that an identifier of the customer is "1381234567") may submit the network slice subscription request to the subscription entity by using a terminal (for example, a mobile phone terminal or a notebook computer, a browser, or another channel) of the customer. The subscription request includes requirement information of the customer for network performance of a network slice, where the requirement information may include a network slice type, a requirement of the network slice performance indicator, and the like.

The subscription entity may provide a plurality of network slice types, so that the network slice types are displayed on a customer terminal for the customer to select. For example, the subscription entity may provide three types for the customer to select: an eMBB type (a small quantity of devices but a high bandwidth requirement), a URLLC type (an extremely low end-to-end latency is required), and an mMTC type (a small bandwidth but a large quantity of devices).

When subscribing to the network slice instance, the customer can specify a charging condition for the network slice performance indicator (the charging condition may be a specific value of the network slice performance indicator, or may be a range value of the network slice performance indicator). For example, if the customer selects a network slice of the eMBB type, the customer may further specify that a bandwidth of the network slice instance is higher than 1000G. If the customer selects a network slice of the URLLC type, the customer may further specify that a maximum latency of the network slice instance is less than 5 milliseconds. If the customer selects a network slice of the eMTC type, the customer may further specify that a quantity of concurrent PDU sessions of the network slice instance is greater than 1 million. The foregoing "bandwidth", "maximum latency", and "quantity of concurrent PDU sessions" are all network slice performance indicators.

It may be understood that when the network performance of the network slice needs to be described by using a plurality of indicators, the customer may specify a charging condition of each network slice performance indicator. For ease of description, in the embodiments of this application, one indicator is taken as an example for description.

Optionally, the subscription entity may further provide a network slice template for the customer to select or a network slice template serves as a basis for the customer to modify, so as to improve customer experience. A network slice type may have a plurality of network slice templates, and each network slice template has a preset charging condition of the network slice performance indicator. For example, a network slice template may be:

```
network slice template 1 {
"slice type": "eMTC"
"charging condition": "a quantity of concurrent sessions exceeds 1 million"
}
```

The customer may select the foregoing template, and modify, based on the foregoing template, a network slice requirement that matches a service operated by the customer. For example, the template is modified to:

```
network slice instance {
"slice type": "eMTC"
"charging condition": "a quantity of concurrent sessions exceeds 500,000"
}
```

Further, the customer determines a charging rule corresponding to the network slice instance. The charging rule is usually related to the charging condition of the network slice performance indicator. For example, different levels of charging are performed based on "a quantity of concurrent sessions". A specific implementation of the charging rule is not limited in this application.

After the customer determines the charging rule and selects a subscription period (namely, a use time range or a charging period of the network slice instance, which is usually a time period), the subscription entity may create and store network slice subscription information. An example is as follows:

```
network slice subscription information {
"customer identifier": "1381234567";
"slice type": "eMBB"
"subscription time": "20180115120000"
"subscription period": "month"
"charging condition": "instantaneous bandwidth is greater than 100M"
"charging rule": "..."
}
```

A value of a "charging rule" field may be a text character string obtained by converting specific content of the charging rule, and the character string may be in an XML (extensible markup language) format, a JSON (JavaScript object notation) format, or another text format, or may be a computer-executable script, or may be data in a binary format obtained by converting specific content of the charging rule. This is not limited in the embodiments of this application.

It may be noted that the customer described in the embodiments of this application may be an industry customer or an enterprise customer that has a plurality of user equipments, for example, a bicycle sharing enterprise or a taxi company, or may be a natural person customer, which is referred to as a customer in the embodiments of this application for ease of description.

Step 402: the subscription entity notifies the NSMF device to enable a network slice service.

Specifically, the subscription entity may send, to the NSMF device, a slice service enabling notification. The slice service enabling notification may include the slice type and the charging condition in the network slice subscription information, so that the NSMF device creates a network slice instance that meets a requirement of the customer.

Optionally, the subscription entity may further include a customer identifier in the slice service enabling notification, so that the NSMF device subsequently establishes a correspondence between the created network slice instance and the customer identifier.

Step 403: the NSMF device creates the network slice instance for the customer.

Specifically, the NSMF device receives the network slice enabling notification from the subscription entity, creates a corresponding network slice instance based on the network slice type and the charging condition in the notification, and allocates a unique identifier, namely, a network slice instance identifier, to the corresponding network slice instance.

Optionally, the NSMF device may allocate the newly created network slice instance to the customer, in other words, establish a correspondence between the network slice instance identifier and the customer identifier.

It may be understood that the NSMF device may alternatively check whether a network slice instance that can meet a requirement of the customer exists in a network. If it is determined that the network slice instance exists and can be allocated to the customer, the NSMF device may directly allocate the existing network slice instance to the customer. In this way, a process of creating a new network slice instance can be omitted.

Optionally, the NSMF device may obtain the customer identifier from the network slice notification message.

Step 404: the NSMF device returns information about the network slice instance to the subscription entity.

Specifically, the NSMF device may return a network slice enabling response to the subscription entity. The response may include information indicating that the network slice is successfully created and the information about the network slice instance, and the information may include the network slice instance identifier and the creation time of the network slice instance.

Step 405: the subscription entity sends the network slice subscription information and the information about the network slice instance to the NSCF device.

Specifically, the subscription entity may send a subscription information notification to the NSCF device, and the notification includes the network slice subscription information in step 401 and the information about the network slice instance in step 404.

Step 404 and step 405 may be understood as that the NSMF device may send the information about the network slice instance to the NSCF device by using the subscription entity. Optionally, the NSMF device may directly send the information about the network slice instance to the NSCF device, for example, an identifier of the network slice instance, the creation time of the network slice instance, and the current status (for example, created or activated) of the network slice instance.

Step 406: the NSCF device determines a network slice performance indicator pfmArg and filtering information filterInfo.

Specifically, after receiving the subscription information notification, the NSCF device may determine the network slice performance indicator pfmArg and the filter information filterInfo based on the slice type and/or the charging condition included in the subscription information notification.

For example, if the subscription information is as follows:

```
For example, if the subscription information is as follows:
network slice subscription information {
"customer identifier": "1381234567";
slice type: "eMBB"
"network slice instance creation time": "20180115120000"
"subscription period": "month"
"charging condition: "bandwidth is greater than 100M"
"charging rule": "..."
}
```

Field content of the charging rule may include the charging method corresponding to the indicator satisfaction situation described in step 401.

In this case, the NSCF device may determine, based on the charging condition or the charging rule in the network slice subscription information, that the filter information filterInfo corresponding to the network slice performance indicator "bandwidth" used for charging may be "less than 100M". The bandwidth is obtained according to an obtaining method ValMtd within an obtaining time range timRng.

Similar to step 201, the subscription indicator pfmArg may also be determined by the NSMF device in a subsequent step by using a method similar to that in this step.

Optionally, the NSCF device may determine, based on any one or any combination of the network slice subscription information, the information about the network slice instance, information preconfigured by the operator, and customer account balance information, an obtaining time range timRng and an obtaining method ValMtd that are of the network slice performance indicator.

The following is an example.

The NSCF device may determine, based on the "network slice instance creation time" and the "subscription period" fields in the network slice subscription information, the obtaining time range timRng of the network slice performance indicator. For example, The NSCF device may determine a current charging period based on the "network slice instance creation time" and the "subscription period" fields, and then use a time range corresponding to the current charging period as the obtaining time range, or use a part of a time range (for example, February 2018) in the current charging period (for example, a first quarter of 2018) as the obtaining time range, or use different time periods corresponding to each of morning, noon, and evening of a day as the obtaining time range. Alternatively, the NSCF device may determine, based on the customer account balance information, the obtaining time range timRng of the network slice performance indicator. For example, the NSCF device may determine, based on the customer account balance information, that the customer may further use the network slice instance of the customer for a maximum of 60 days. In this case, the NSCF device may determine that the obtaining time range is within 60 days after a current time. The NSCF device may also determine the obtaining time range timRng based on the subscription information and the balance information. For example, the NSCF device may determine, based on the subscription information, that the obtaining time range is within 30 days after the current time, but because an account balance of the customer is insufficient for using the network slice instance for 30 days, for example, if only 15 days are available, the NSCF device may determine that the obtaining time range timRng is within 15 days after a current time.

Alternatively, the NSCF device may determine the obtaining time range based on a charging period (for example, first and last dates of a natural month) uniformly preconfigured by the operator for different network slice instances.

Alternatively, the NSCF device may determine the obtaining method ValMtd based on the previously determined name of the network slice performance indicator, where the obtaining method ValMtd may carry an interval time intv. The indicator "latency" is taken as an example. The NSCF device may determine that the obtaining method is using an average value/maximum value/minimum value of two adjacent obtained values as a value of the network slice performance indicator, and intv may represent a time interval between two adjacent values of the network slice performance indicator. In addition, intv may be included in the subscription request.

The foregoing manner of determining the obtaining time range and the obtaining method is merely an example. A manner of determining the obtaining time range and the obtaining method by the NSCF device is not limited in the embodiments of this application.

Step 407: the NSCF device sends a subscription request to the NSMF device, where the subscription request includes the nsiId, pfmArg, and filterInfo.

Specifically, the NSCF device includes nsiId, pfmArg, and filterInfo in the subscription request, and sends the subscription request to the NSMF device.

The parameters nsiId, pfmArg, and filterInfo are respectively used to indicate that the NSMF device needs to obtain a value that is of the network slice performance indicator pfmArg in the network slice instance corresponding to nsiId and that matches the filter information filterInfo.

Parameters timRng and ValMtd are optional, and are respectively configured to indicate the obtaining time range and the obtaining method of the corresponding indicator, so that the NSMF device obtains, within the obtaining time range indicated by timRng, the network slice performance indicator pfmArg according to the obtaining method described in ValMtd, to obtain the value that is of the network slice performance indicator pfmArg and that matches the filter information filterInfo.

A form of the obtaining method ValMtd in the subscription request message may be a form of a digital identifier or a character identifier (for example, "001" or "A"), or may be a computer-executable script, code, a formula, a function, or the like. This is not limited in the embodiments of this application. Any form in which the NSMF device can determine the obtaining method to be used falls within the meaning of the solutions in the embodiments of this application.

Optionally, the NSCF device may further include, in the subscription request, an address for receiving a subscription notification, so that the NSMF device may subsequently send the subscription notification to the NSCF device based on the address.

Optionally, the NSCF device may further include the customer identifier in the subscription request message, so that the NSMF device subsequently determines an identifier of a corresponding network slice instance based on the customer identifier.

Optionally, the NSCF device may further include a condition for sending a notification in the subscription request message, so that the NSMF device subsequently sends a subscription notification to the NSCF device based on the condition, to meet a charging requirement. The condition for sending the notification includes any one or any combination of the following: a period or an interval time for sending the subscription notification, a specific time point for sending the subscription notification, triggering by a key event (for example, modification of the network slice instance subscribed by the customer, or an unexpected interruption), and the like.

The NSCF device may obtain an address of the NSMF device by querying a network register function (NRF) device, or may obtain the address of the NSMF device from locally preconfigured information, and send the subscription request to the address.

The following is an example structure of the subscription request message:

```
subscription: {
  "nsiId": "s-NSSAI value",
  "cusId": "customer ID",
  "startTime": "obtain a start time of a period",
  "endTime": "obtain an end time of a period",
  "notificationURI": "notification message URI",
  "pfmArgArray": [
    {
      "pfmArg": "bandwidth",
      "filterInfo": "<100G"
    }
  ]
}
```

The subscription request message may indicate that, for the network slice performance indicator "bandwidth", the filtering information is specifically "less than 100G", and the NSMF device may obtain a value of "bandwidth less than 100G", or a combination of the value and a time.

Step 408: the NSMF device returns a subscription response to the NSCF device, where the subscription response includes subId and filterInfo.

After receiving the subscription request, the NSMF device generates a subscription resource, allocates an identifier subId to the subscription resource, and returns the subscription response to the NSCF device, to indicate to the NSCF device that the subscription succeeds. The NSMF device includes the subscription identifier subId and filterInfo in the subscription response, so that the NSCF device can use the subscription identifier subId and filterInfo in subsequent processes such as requesting to change the subscription, requesting to perform unsubscription, and querying subscription information. For details, refer to subsequent embodiments of this application.

For the subscription request, the NSMF device obtains, in a specified obtaining time range (timRng) by using a specified obtaining method (ValMtd), the value pfmArgVal that is of the network slice performance indicator pfmArg of the network slice instance identified by using nsiId and that matches the filtering information. When the subscription request does not include timRng or ValMtd, the NSMF device may determine the obtaining time range or the obtaining method based on preconfigured information of the operator. For example, the preconfigured information may be set as follows: a default obtaining time range is a first day of a natural month to a last day of the natural month, and a default obtaining method is obtaining a value per second, and averaging every two adjacent values to obtain the value pfmArgVal of the network slice performance indicator.

Step 409: when obtaining the value pfmArgVal that is of the network slice performance indicator and that matches the filtering information, the NSMF device sends the subscription notification to the NSCF device, where the subscription notification includes pfmArgVal.

Optionally, the NSMF device records a time pfmArgVal-Tim corresponding to the value pfmArgVal of the network slice performance indicator, and a value of the time pfmArgVal may be a specific time point, or may be a time period (for example, the time period may be specifically from a start moment of when the NSCF device sends the subscription request to the NSMF device to a moment when the NSMF device obtains the value pfmArgVal of the network slice performance indicator). For details, refer to definitions and examples of the value of the network slice performance indicator in the embodiments of this application.

Specifically, the NSMF device includes pfmArgVal in the subscription notification, and sends the subscription notification to the NSCF device. The NSMF device may send the subscription notification to the NSCF device based on the address that is sent by the NSCF device and that is for receiving the subscription notification.

Optionally, the NSMF device may also include an obtaining time pfmArgTim in the subscription notification, so that the NSCF device determines an obtaining time corresponding to a value pfmArgVal of each network slice performance indicator, so as to perform charging.

Step 410: when receiving the subscription notification from the NSMF device, the NSCF device performs charging on the network slice instance based on pfmArgVal.

Specifically, after receiving the subscription notification from the NSMF device, the NSCF device performs, based on pfmArgVal in the subscription notification, charging on the network slice instance corresponding to nsiId. This may be specifically one of the following processing manners.

(Manner 1): pfmArgVal is written into a charging data record. If the subscription notification further includes pfmArgTim, write pfmArgTim to the charging data record.

Specifically, the NSCF device may create a charging data record for a corresponding customer or the network slice instance corresponding to nsiId (if the charging data record exists, the charging data record does not need to be created), and then write pfmArgVal into the charging data record.

Optionally, the NSCF device may further write nsiId and/or an identifier of the corresponding customer into the charging data record.

As an example, a form of the foregoing charging data record may be shown in Table 1.

TABLE 1

Charging data record for storing a value of a network slice performance indicator

| Network instance identifier | nsiId |
| Customer identifier | 1381234567 |

| Obtaining start time | Obtaining end time | Name of the network slice performance indicator | Value of the network slice performance indicator |
| --- | --- | --- | --- |
| 20190101-00:00:00 | 20190101-00:00:05 | Bandwidth | 301M |
| 20190101-00:00:00 | 20190101-00:00:05 | Quantity of concurrent sessions | 1.24 million |

Optionally, the NSCF device may transmit the charging data record to a module or a network entity responsible for calculating a fee, and the module or the network entity calculates the fee for use of the network slice instance corresponding to nsiId. The module or the network entity responsible for calculating the fee may be deployed on the NSCF device, or may be deployed outside the NSCF device.

(Manner 2): The fee for use of the network slice instance is calculated based on pfmArgVal.

Specifically, the NSCF device may calculate, based on the value pfmArgVal of the network slice performance indicator, the fee for use of the network slice instance corresponding to nsiId.

The NSCF device may first obtain a charging rule chgPol corresponding to the network slice instance corresponding to nsiId, and may specifically obtain the charging rule chgPol from the network slice subscription information in step 401, or may obtain the charging rule chgPol from the information preconfigured by the operator. A path for obtaining the charging rule by the NSCF device is not limited in the embodiments of this application. Further, based on pfmArgVal and chgPol, the NSCF device may calculate the fee for use of the network slice instance corresponding to nsiId.

Step 411: when receiving no subscription notification from the NSMF device or receiving, from the NSMF device, another subscription notification that does not carry pfmArgVal, the NSCF device performs charging on the network slice instance according to the charging rule corresponding to the network slice performance indicator.

Specifically, after not receiving the subscription notification from the NSMF device, the NSCF device may determine that the value pfmArgVal of the network slice performance indicator pfmArg of the network slice instance corresponding to nsiId does not match the filter information filterInfo. Further, the NSCF device may perform, according to the charging rule, charging on the network slice instance corresponding to nsiId. For a specific processing manner, refer to the processing manner in step 410. Details are not described herein again.

In the method for performing charging on a network resource corresponding to FIG. 4A and FIG. 4B, a subscription-notification mechanism is used. The NSCF device determines the filtering information, the NSMF device obtains the network slice performance indicator, the NSCF device performs charging based on the value that is of the network slice performance indicator and that matches the filtering information, and the NSCF device performs charging according to the charging rule when the NSCF device does not receive the value that is of the network slice performance indicator and that matches the filtering information. The subscription-notification mechanism has the following advantages: As a network slice management device, the NSMF device only needs to collect the value that is of the network slice performance indicator and that matches the filtering information. Because the NSMF device only needs to obtain/collect the value that is of the network slice performance indicator and that matches the filtering information, and does not need to perform a charging-related operation, calculation load of the NSMF device may be reduced, so that the value of the network slice performance indicator does not need to be frequently transmitted between the NSMF device and the NSCF device. In this way, occupation of a communication bandwidth between the NSMF device and the NSCF device is reduced, and calculation load of charging performed by the NSCF device is reduced.

In addition, the NSMF device may also store the value of the network slice performance indicator, and collect a large quantity of values of the network slice performance indicator related to the network slice instance, so as to help implement a more abundant and flexible charging service, for example, facilitate subsequent calculation of the fee for use of the network slice instance. In addition, when a network resource is idle, the NSMF device may first compress values of all network slice performance indicators, and then send the compressed values of all the network slice performance indicators to the NSCF device, so that the NSCF device can obtain real-time data of the network slice performance indicators. Because the network slice performance indicator is data that the customer cares about, and can better reflect an investment of the operator, a matching degree between a charging result of the customer and a network resource investment is improved, the foregoing diversified application scenarios are facilitated, and diversified network service requirements of industry customers are met.

Figure 5:
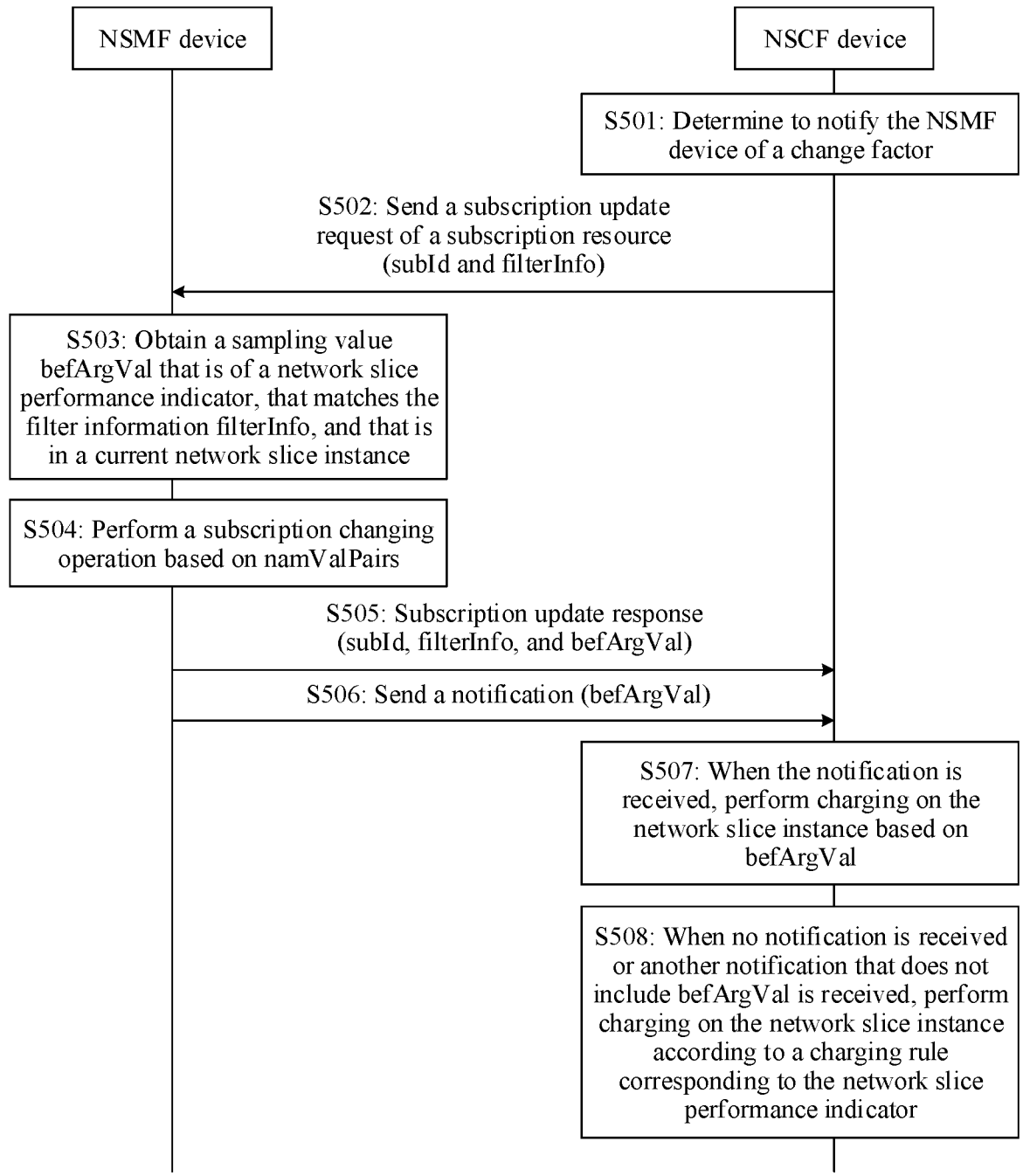
FIG. 5 is a flowchart of still another method for performing charging on a network resource according to an embodiment of this application.

Considering external factors such as changes of subscription information of the customer, to better meet a charging requirement, the NSCF device may be supported in indicating the NSMF device to change a subscription resource. FIG. 5 is a flowchart of still another method for performing charging on a network resource according to an embodiment of this application. The method procedure is also implemented based on the architecture shown in FIG. 3. An NSMF device corresponds to the NSMF device 302 in FIG. 3, and an NSCF device corresponds to the NSCF device 301 in FIG. 3. In the method procedure, the NSCF device may request the NSMF device to change a subscription based on a change of the subscription of a customer. The method procedure specifically includes the following steps.

Step 501: the NSCF device determines to notify the NSMF device of a change factor.

Specifically, the NSCF device determines to notify, based on the change factor such as a change of subscription information that is of the customer and that is received from a subscription entity, a change of an account balance of the customer, or the like, the NSMF device of the change factor. The change factor includes but is not limited to a network slice performance indicator, and an obtaining time range, an obtaining method or an interval time, and filtering information, and then a name-value pair list namValPairs is formed based on these change factors. In each name-value pair, "name" is used to indicate, to the NSMF device, a corresponding change, and "value" is used to indicate, to the NSMF device, a reason for the change.

For example, the following name-value pair list represents: the "obtaining method (corresponding to "ValMtd")" is changed from "an obtaining frequency is obtained once per second, and an average value of values obtained every two consecutive times is used as a value of the network slice performance indicator pfmArg (for example, identified by "avrg")" to "an obtaining frequency is obtained once per second, and a maximum value obtained every two consecutive times as a value of the network slice performance indicator pfmArg (for example, identified by "max")". In addition, the "obtaining time range (corresponding to "mgTim")" is changed to "20181001-20181015", and the filtering information (corresponding to "filterInfo") corresponding to the network slice performance indicator "latency" is changed to "more than 50 ms".

```
namValPairs {
namValPair {
"nam": "ValMtd"
"val": "max"
}
namValPair {
"nam": "rngTim"
"Val": "20181001-20181015"
}
namValPair {
"nam": "filterInfo"
"val": "more than 50 ms"
}
}
```

For another example, when the NSCF device needs to temporarily perform charging (for example, charging is triggered because the customer temporarily requests account checking or bill run at an intermediate time of a charging period or before bill run time), a new indication parameter may be carried in a subscription update request, for example, immediately Reporting, to indicate that the value that is of the network slice performance indicator and that matches the filtering information needs to be immediately reported (without waiting for an end of an obtaining period). Alternatively, the subscription update request does not carry any parameter, to indicate that the value that is of the network slice performance indicator and that matches the filtering information needs to be immediately reported.

Step 502: the NSCF device sends the subscription update request for a subscription resource to the NSMF device, where the subscription update request includes subId and filterInfo.

Specifically, the NSCF device sends the subscription update request to the NSMF device, where the subscription update request includes a subscription identifier subId and filterInfo that are previously received from the NSMF device and allocated by the NSMF device. In addition, namValPairs determined in the previous step is an optional parameter, and may alternatively be included in the subscription update request.

Step 503: the NSMF device obtains a value befArgVal that is of the network slice performance indicator and that matches filterInfo and that is in a current network slice instance.

Specifically, after receiving the subscription update request, the NSMF device first obtains the value that is of the network slice performance indicator, that matches the filter information filterInfo, and that is in the current network slice instance. Previously, the NSCF device subscribes to the value befArgVal (for example, pfmArgVal in the corresponding method procedure in FIG. 4A and FIG. 4B) that is of the network slice performance indicator and that matches the filter information filterInfo. In this case, the NSMF device should currently obtain the value that is of the network slice performance indicator (for example, pfmArg), that matches the filtering information, and that is previously subscribed to by the NSCF device, and send the obtained value of the network slice performance indicator. If the value of the network slice performance indicator near the current time has been sent, or the NSCF device no longer needs the current value befArgVal that is of the network slice performance indicator and that matches the filtering information, the NSMF device may not perform this step.

Step 504: the NSMF device performs a subscription changing operation for the subscription resource based on namValPairs.

Specifically, the NSMF device changes the parameters in the previous subscription based on each namValPair in namValPairs. For example, the "obtaining method" is changed to "calculate the maximum value", the "obtaining time range" is changed to "20181001-20181015", and the "filtering information" corresponding to the network slice performance indicator "latency" is changed from "more than 50 ms" to "more than 60 ms", so that a previously created task obtains the value of the network slice performance indicator based on the new parameters.

Step 505: the NSMF device sends a subscription update response message to the NSCF device, where the subscription update response message includes subId, filterInfo, and befArgVal.

Specifically, the NSMF device sends the subscription update response message to the NSCF device, where the subscription update response message includes subId, filterInfo, and befArgVal, and befArgVal is optional.

Step 506: the NSMF device sends a notification to the NSCF device, where the notification includes befArgVal.

This step is an optional step. When the NSMF device does not send befArgVal by using the subscription response message, as an alternative measure, the NSMF device may alternatively send a notification that includes befArgVal to the NSCF device.

Step 507: when receiving the notification, the NSCF device performs charging on the network slice instance based on befArgVal.

Specifically, after receiving the subscription response message or notification message, the NSCF device performs charging on the network slice instance based on befArgVal in the subscription response message or notification message. For details, refer to the execution process of step 410.

Step 508: when the NSCF device does not receive the notification or receives another subscription notification that does not include befArgVal, the NSCF device performs charging on the network slice instance according to a charging rule corresponding to the network slice performance indicator.

Refer to the execution process of step 411.

Figure 6:
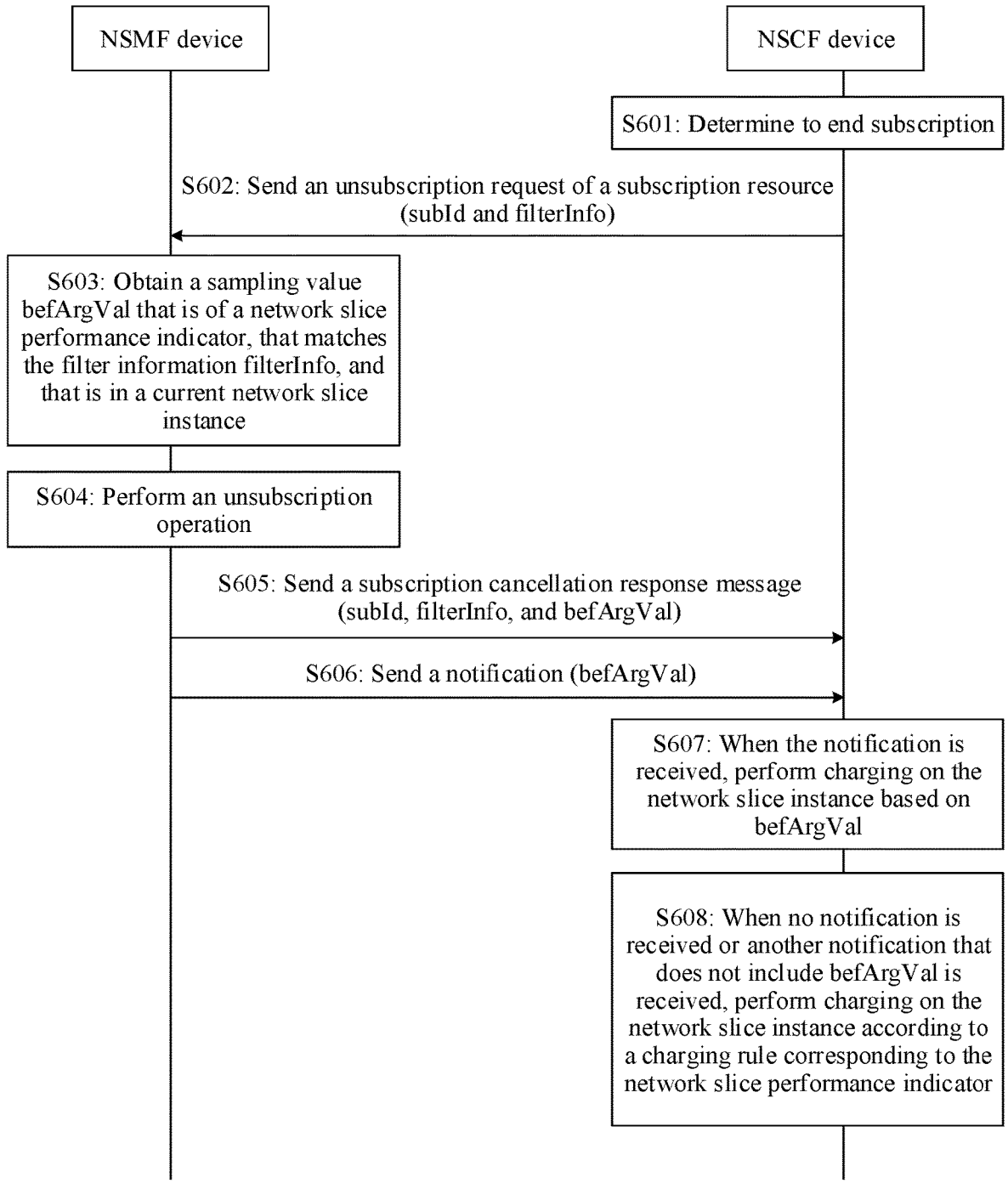
FIG. 6 is a flowchart of still another method for performing charging on a network resource according to an embodiment of this application.

Considering that the NSMF device may no longer need to provide the value that is of the network slice performance indicator in the network slice instance and that matches the filtering information after a use time of a network slice is terminated or expires, the NSCF device may be supported in indicating the NSMF device to perform unsubscription related to the subscription resource, so that the NSMF device recycles a previously invested computing resource in a timely manner. FIG. 6 is a flowchart of still another method for performing charging on a network resource according to an embodiment of this application. The method procedure is also implemented based on the architecture shown in FIG. 3. An NSMF device corresponds to the NSMF device 302 in FIG. 3, and an NSCF device corresponds to the NSCF device 301 in FIG. 3. In the method procedure, the NSCF device may request, based on subscription information of a customer or account balance information of the customer, the NSMF device to perform unsubscription related to the subscription resource. The method procedure specifically includes the following steps.

Step 601: the NSCF device determines to end subscription.

Specifically, the NSCF device determines to notify, based on a factor such as the subscription information of the customer or the account balance of the customer, the NSMF device to end the subscription.

Step 602: the NSCF device sends an unsubscription request message related to the subscription resource to the NSMF device, where the unsubscription request message includes an identifier subId of the subscription resource and filter information filterInfo.

Specifically, the NSCF device sends the unsubscription request message related to the subscription resource to the NSMF device, and the unsubscription request message includes the identifier subId of the subscription resource and the filter information filterInfo that are previously received from the NSMF device and that are allocated by the NSMF device.

The subscription resource is the subscription resource described in steps 202, 408, and 502.

Step 603: the NSMF device obtains a value befArgVal that is of a network slice performance indicator, that matches the filter information filterInfo, and that is in a current network slice instance.

This step is similar to the step 503.

Step 604: the NSMF device performs an unsubscription operation.

Specifically, the NSMF device may stop and delete a previously created task to obtain the value that is of the network slice performance indicator and that matches the filter information filterInfo, to recycle a computing resource occupied by the task.

Step 605: the NSMF device sends an unsubscription response message to the NSCF device, where the unsubscription response message includes subId, filterInfo, and befArgVal.

This step is similar to the step 505.

Step 606: the NSMF device sends a notification to the NSCF device, where the notification includes befArgVal.

This step is similar to the step 506.

Step 607: when receiving the notification, the NSCF device performs charging on the network slice instance based on befArgVal.

This step is similar to the step 507.

Step 608: when the NSCF device does not receive the notification or receives another notification that does not include befArgVal, the NSCF device performs charging on the network slice instance according to a charging rule corresponding to the network slice performance indicator.

This step is similar to the step 508.

Figure 7:
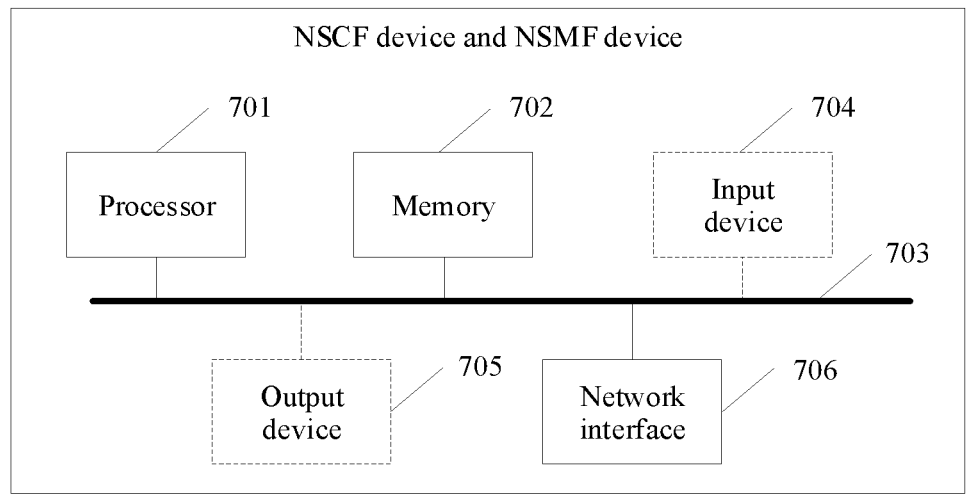
FIG. 7 is a structural diagram of hardware of an NSCF device or an NSMF device according to an embodiment of this application.

FIG. 7 is a structural diagram of hardware of an NSCF device or an NSMF device according to an embodiment of this application. All NSCF devices (for example, 101 in FIGS. 1 and 301 in FIG. 3) and all NSMF devices (for example, 102 in FIGS. 1 and 302 in FIG. 3) in the embodiments of this application may use general-purpose computer hardware shown in FIG. 7. The general-purpose computer hardware includes a processor 701, a memory 702, a bus 703, an input device 704, an output device 705, and a network interface 706. The input device 704 and the output device 705 are optional.

Specifically, the memory 702 may include a computer storage medium in a form of a volatile and/or nonvolatile memory, for example, a read-only memory and/or a random access memory. The memory 702 can store an operating system, an application program, another program module, executable code, and program data.

The input device 704 may be configured to input information to facilitate a system administrator to operate and manage the device, for example, configure a default charging rule and a default obtaining time range. The input device 704 may be a keyboard or a pointing device, for example, a mouse, a trackball, a touchpad, a microphone, a joystick, a game pad, a satellite television antenna, a scanner, or similar devices. These input devices may be connected to the processor 701 through the bus 703.

The output device 705 may be configured to output information, so that the system administrator operates and manages the device. The output device 705 may be a monitor, or another peripheral output device, for example, a loudspeaker and/or a print device. These output devices may also be connected to the processor 701 through the bus 703.

The NSCF device or the NSMF device may be connected to a network through the network interface 706, for example, connected to a local area network (LAN). In a network access environment, computer-executable instructions stored in the device are not limited to being locally stored, but may be stored in a remote storage device.

For the NSCF device, when the processor 701 in the NSCF device executes the executable code or the application program stored in the memory 702, the NSCF device may perform the method steps corresponding to the NSCF device in all the foregoing embodiments, for example, steps 201, 202, 205, 206, 207, 209, 210, 406, 407, 410, and 411. For a specific execution process, refer to the foregoing embodiments. Details are not described herein again.

For the NSMF device, when the processor 701 executes the executable code or the application program stored in the memory 702, the NSMF device may perform the method steps corresponding to the NSMF device in all the foregoing embodiments, for example, the steps 203, 204, 208, 211, 408, and 409. For a specific execution process, refer to the foregoing embodiments. Details are not described herein again.

Figure 8:
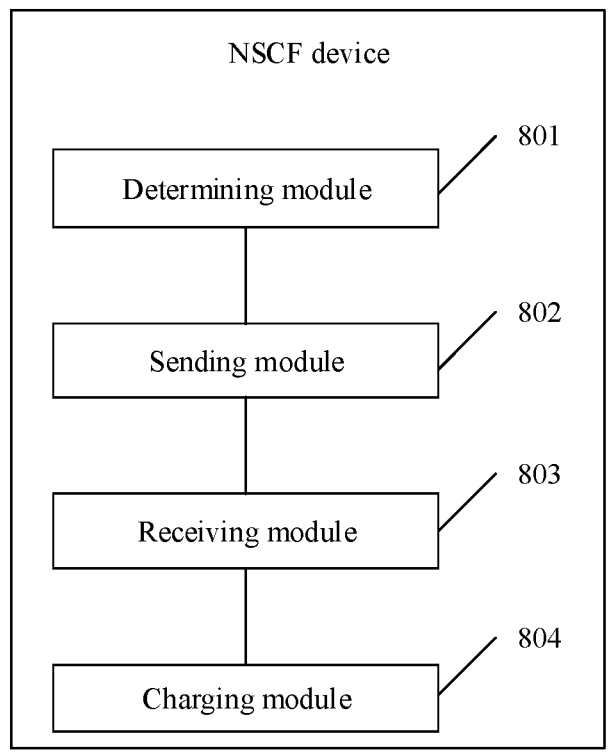
FIG. 8 is a schematic structural diagram of an NSCF device according to an embodiment of this application.

FIG. 8 is a schematic structural diagram of an NSCF device according to an embodiment of this application. The NSCF device includes a determining module 801, a sending module 802, a receiving module 803, and a charging module 804.

The determining module 801 is configured to determine a network slice performance indicator and filtering information that are used for performing charging on a network slice instance, for example, determine the network slice performance indicator based on subscription information of a customer or information preconfigured by an operator, and determine the corresponding filtering information based on an actual situation and a charging condition of the network slice performance indicator. For a specific execution process, refer to step descriptions on an NSCF device side in the foregoing embodiments, for example, steps 201 and 406.

The sending module 802 is configured to include an identifier of the network slice instance, the network slice performance indicator, and the filtering information in a first message, and send the first message to an NSMF device, for example, create a subscription request message, include the identifier of the network slice instance, the network slice performance indicator, and the filtering information in the subscription request message, and send the subscription request message to the NSMF device. For a specific execution process, refer to step description on the NSCF device side in the foregoing embodiment, for example, step 202. Alternatively, for a specific execution process, refer to step description on an NSMF device side in the foregoing embodiment, for example, step 409.

The receiving module 803 is configured to receive a second message, where the second message includes a value that is of the network slice performance indicator and that matches the filtering information, and the second message is sent by the NSMF device when the NSMF device obtains the value that is of the network slice performance indicator of the network slice instance and that matches the filtering information. For a specific execution process, refer to step descriptions on the NSMF device side in the foregoing embodiments, for example, steps 211 and 409.

The charging module 804 is configured to perform charging on the network slice instance based on the value of the network slice performance indicator, for example, receive a subscription notification message from the NSMF device, where the subscription notification message includes the value that is of the network slice performance indicator and that matches the filtering information, and the value of the network slice performance indicator may be specifically stored in a charging data record, so as to subsequently calculate a fee for use. For a specific execution process, refer to step description on the NSCF device side in the foregoing embodiment, for example, step 410.

In this embodiment, the NSCF device is presented in a form of a functional module. The "module" herein may be an application-specific integrated circuit (ASIC), a circuit, a processor and a memory that execute one or more software or firmware programs, an integrated logic circuit, and/or another device that can provide the foregoing functions. In a simple embodiment, a person skilled in the art may figure out that the NSCF device may also be in a form shown in FIG. 7. The determining module 801, the sending module 802, the receiving module 803, and the charging module 804 may all be implemented by using the processor 701 and the memory 702 in FIG. 7. For example, a function of calculating the fee for use of the network slice instance by the charging module 804 may be implemented by the processor 701 by executing the code stored in the memory 702.

Figure 9:
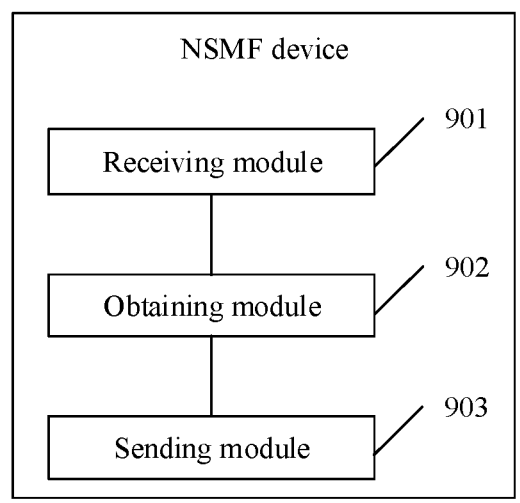
FIG. 9 is a schematic structural diagram of an NSMF device according to an embodiment of this application.

FIG. 9 is a schematic structural diagram of an NSMF device according to an embodiment of this application. The NSMF device includes a receiving module 901, an obtaining module 902, and a sending module 903.

The receiving module 901 is configured to receive a first message from an NSCF device, where the first message includes an identifier of a network slice instance, a network slice performance indicator, and filtering information. For a specific execution process, refer to step description on an NSCF device side in the foregoing embodiment, for example, step 202. Alternatively, for a specific execution process, refer to step description on the NSCF device side in the foregoing embodiment, for example, step 407.

The obtaining module 902 is configured to obtain, based on the first message, a value that is of the network slice performance indicator and that matches the filtering information. For a specific execution process, refer to step descriptions on an NSMF device side in the foregoing embodiments, for example, steps 203 and 409.

The sending module 903 is configured to send a second message to the NSCF device, where the second message includes the value that is of the network slice performance indicator and that matches the filtering information. For a specific execution process, refer to step descriptions on the NSMF device side in the foregoing embodiments, for example, steps 204 and 409.

In this embodiment, the NSMF device is presented in a form of a functional module. The "module" herein may be an application-specific integrated circuit (ASIC), a circuit, a processor and a memory that execute one or more software or firmware programs, an integrated logic circuit, and/or another device that can provide the foregoing functions. In a simple embodiment, a person skilled in the art may figure out that the NSMF device may also be in a form shown in FIG. 7. The receiving module 901, the obtaining module 902, and the sending module 903 may all be implemented by using the processor 701 and the memory 702 in FIG. 7. For example, a function of obtaining the value of the network slice performance indicator by the obtaining module 902 may be implemented by the processor 701 by executing the code stored in the memory 702.

A person of ordinary skill in the art may be aware that, units, algorithms, and steps in the examples described with reference to the embodiments disclosed in this specification can be implemented by electronic hardware, computer software, or a combination thereof. To clearly describe interchangeability between the hardware and the software, the foregoing has generally described compositions and steps of the examples based on functions. Whether the functions are performed by hardware or software depends on particular applications and design conditions of the technical solutions. A person skilled in the art may use different methods to implement the described functions for each particular application, but it should not be considered that the implementation goes beyond the scope of this application.

It may be clearly understood by a person of ordinary skill in the art that, for ease and brief description, for a detailed working process of the foregoing system, apparatus, and unit, refer to a corresponding process in the foregoing method embodiments, and details are not described herein again.

In the plurality of embodiments provided in this application, it may be understood that, the disclosed system, apparatus, and method may be implemented in another manner. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions in the embodiments of this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions in this application essentially, or the part contributing to the conventional technology, or all or some of the technical solutions may be represented in a form of a software product. The computer software product is stored in a storage medium and includes a plurality of instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory, a random access memory, a magnetic disk, or an optical disc.

The foregoing descriptions are merely specific embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A system for performing charging on a network resource, comprising:
   a network slice charging function device; and
   a network slice management function device; wherein
   the network slice charging function device comprises:
      at least one first processor; and
      one or more first memories coupled to the at least one first processor and storing first programming instructions for execution by the at least one first processor to:
         send a first message to the network slice management function device, wherein the first message comprises an identifier of a network slice instance and filtering information, the filtering information indicates the network slice management function device to send a value that is of a network slice performance indicator of the network slice instance and that matches the filtering information, and the network slice performance indicator describes network performance of the network slice instance; wherein
   the network slice management function device comprises:
      at least one second processor; and
      one or more second memories coupled to the at least one second processor and storing second programming instructions for execution by the at least one second processor to:
         send, when obtaining the value, a second message to the network slice charging function device, wherein the second message comprises the value; and wherein
   the first programming instructions are for execution by the at least one first processor to perform, when receiving the second message from the network slice management function device, charging on the network slice instance based on the value.

2. The system according to claim 1, wherein the filtering information comprises an indication identifier, the indication identifier indicates the network slice management function device to send a particular value that is of the network slice performance indicator of the network slice instance and that corresponds to a constraint condition, and the constraint condition is a constraint condition that is of the network slice performance indicator and that is stored in the network slice management function device.

3. The system according to claim 1, wherein the filtering information comprises a constraint condition, the constraint condition indicates the network slice management function device to send a particular value that is of the network slice performance indicator of the network slice instance and that corresponds to the constraint condition.

4. The system according to claim 1, wherein the first programming instructions are for execution by the at least one first processor to:
perform, when the network slice charging function device does not receive the second message from the network slice management function device, charging on the network slice instance according to a charging rule corresponding to the network slice performance indicator, wherein the second message is sent by the network slice management function device when the network slice management function device obtains the value, and the second message comprises the value; or
perform, when receiving a third message from the network slice management function device, charging on the network slice instance according to a charging rule corresponding to the network slice performance indicator, wherein the third message does not comprise the value, and the second message is sent by the network slice management function device when the network slice management function device obtains the value.

5. The system according to claim 1, wherein:
the first message is a subscription request message, the second message is a subscription notification message, and the first message further comprises an address for receiving data;
the network slice charging function device sends the subscription request message to the network slice management function device; and
after receiving the subscription request message, the network slice management function device generates a subscription resource for the network slice instance, and sends the subscription notification message to the network slice charging function device based on the address.

6. The system according to claim 5, wherein:
the first programming instructions are for execution by the at least one first processor to:
send, to the network slice management function device, a subscription update request message for updating the subscription resource, wherein the subscription update request message comprises at least one of updated target filtering information, an updated target obtaining time range, an updated target interval time, an updated target obtaining method, or an updated target network slice performance indicator; and
the second programming instructions are for execution by the at least one second processor to:
perform a subscription changing operation on the subscription resource based on the subscription update request message; and
send, to the network slice charging function device, the value, wherein the value exists before the subscription resource changes.

7. A method for performing charging on a network resource, comprising:
sending, by a network slice charging function device, a first message to a network slice management function device, wherein the first message comprises an identifier of a network slice instance and filtering information, the filtering information indicates the network slice management function device to send a value that is of a network slice performance indicator of the network slice instance and that matches the filtering information, and the network slice performance indicator describes network performance of the network slice instance;
receiving, by the network slice charging function device, a second message from the network slice management function device, wherein the second message comprises the value; and
performing, by the network slice charging function device, charging on the network slice instance based on the value.

8. The method according to claim 7, wherein the filtering information comprises an indication identifier, the indication identifier indicates the network slice management function device to send a particular value that is of the network slice performance indicator of the network slice instance and that corresponds to a constraint condition, and the constraint condition is a constraint condition that is of the network slice performance indicator and that is stored in the network slice management function device.

9. The method according to claim 7, wherein the filtering information comprises a constraint condition, the constraint condition indicates the network slice management function device to send a particular value that is of the network slice performance indicator of the network slice instance and that corresponds to the constraint condition.

10. The method according to claim 7, wherein the first message further comprises an obtaining time range, and the obtaining time range indicates the network slice management function device to obtain the value within the obtaining time range.

11. The method according to claim 7, wherein the method further comprises:
when the network slice charging function device does not receive the second message from the network slice management function device, performing, by the network slice charging function device, charging on the network slice instance according to a charging rule corresponding to the network slice performance indicator, wherein the second message is sent by the network slice management function device when the network slice management function device obtains the value, and the second message comprises the value; or
when receiving a third message from the network slice management function device, performing, by the network slice charging function device, charging on the network slice instance according to a charging rule corresponding to the network slice performance indicator, wherein the third message does not comprise the value, and the second message is sent by the network slice management function device when the network slice management function device obtains the value.

12. The method according to claim 7, wherein the first message is a subscription request message, the second message is a subscription notification message, the subscription request message is used to request the network slice management function device to generate a subscription resource for the network slice instance, the first message further comprises an address for receiving data, and the subscription request message indicates the network slice management function device to send the subscription notification message to the network slice charging function device based on the address.

13. The method according to claim 12, wherein the method further comprises:
sending, by the network slice charging function device to the network slice management function device, a subscription update request message for updating the subscription resource, wherein the subscription update request message comprises at least one of updated target filtering information, an updated target obtaining time range, an updated target interval time, an updated target obtaining method, or an updated target network slice performance indicator; and
receiving, by the network slice charging function device from the network slice management function device, the value, wherein the value exists before the subscription resource changes.

14. The method according to claim 12, wherein the method further comprises:
sending, by the network slice charging function device, an unsubscription request message related to the subscription resource to the network slice management function device; and
receiving, by the network slice charging function device from the network slice management function device, the value, wherein the value exists before unsubscription related to the subscription resource.

15. A method for performing charging on a network resource, comprising:
receiving, by a network slice management function device, a first message from a network slice charging function device, wherein the first message comprises an identifier of a network slice instance and filtering information, and a network slice performance indicator describes network performance of the network slice instance;
obtaining, by the network slice management function device, a value that is of the network slice performance indicator of the network slice instance and that matches the filtering information; and
sending, by the network slice management function device, a second message to the network slice charging function device, wherein the second message comprises the value, and the second message is used by the network slice charging function device to perform charging on the network slice instance based on the value.

16. The method according to claim 15, wherein the filtering information comprises an indication identifier, the indication identifier indicates the network slice management function device to send a particular value that is of the network slice performance indicator of the network slice instance and that corresponds to a constraint condition, and the constraint condition is a constraint condition that is of the network slice performance indicator and that is stored in the network slice management function device.

17. The method according to claim 15, wherein the filtering information comprises a constraint condition, and the constraint condition indicates the network slice management function device to send a particular value that is of the network slice performance indicator of the network slice instance and that corresponds to the constraint condition.

18. The method according to claim 15, wherein:
the first message further comprises an obtaining time range; and
the obtaining, by the network slice management function device, a value that is of the network slice performance indicator of the network slice instance and that matches the filtering information comprises obtaining, within the obtaining time range, the value.

19. The method according to claim 15, wherein:
the first message is a subscription request message, the second message is a subscription notification message, and the first message further comprises an address for receiving data; and
after receiving the subscription request message from the network slice charging function device, the network slice management function device generates a subscription resource for the network slice instance, and sends the subscription notification message to the network slice charging function device based on the address.

20. The method according to claim 19, wherein the method further comprises:
receiving, by the network slice management function device from the network slice charging function device, a subscription update request message for updating the subscription resource, wherein the subscription update request message comprises at least one of updated target filtering information, an updated target obtaining time range, an updated target interval time, an updated target obtaining method, or an updated target network slice performance indicator;
performing, by the network slice management function device, a subscription changing operation on the subscription resource based on the subscription update request message; and
sending, by the network slice management function device to the network slice charging function device, the value, wherein the value exists before the subscription resource changes.

* * * * *